US010290236B2

(12) United States Patent
Bernal

(10) Patent No.: US 10,290,236 B2
(45) Date of Patent: May 14, 2019

(54) METHOD FOR FABRICATING SIMULATED TISSUE STRUCTURES BY MEANS OF MULTI MATERIAL 3D PRINTING

(71) Applicant: Bioniko Consulting LLC, Sunny Isles Beach, FL (US)

(72) Inventor: Andres Bernal, Sunny Isles Beach, FL (US)

(73) Assignee: BIONIKO CONSULTING LLC, Sunny Isles Beach, FL (US)

( * ) Notice: Subject to any disclaimer, the term of this patent is extended or adjusted under 35 U.S.C. 154(b) by 332 days.

(21) Appl. No.: 15/256,975

(22) Filed: Sep. 6, 2016

(65) Prior Publication Data
US 2016/0372011 A1    Dec. 22, 2016

Related U.S. Application Data

(63) Continuation-in-part of application No. 13/889,494, filed on May 8, 2013, now Pat. No. 9,437,119, and a continuation-in-part of application No. 14/468,769, filed on Aug. 26, 2014, now abandoned.

(60) Provisional application No. 61/644,257, filed on May 8, 2012, provisional application No. 61/644,248, filed on May 8, 2012.

(51) Int. Cl.
*G09B 23/34*    (2006.01)

(52) U.S. Cl.
CPC .................................. *G09B 23/34* (2013.01)

(58) Field of Classification Search
CPC ........ G09B 23/24; G09B 23/26; G09B 23/28; G09B 23/30; G09B 23/34; G09B 23/36
See application file for complete search history.

(56) References Cited

U.S. PATENT DOCUMENTS

| 4,601,673 A | 7/1986 | Nasca |
| 4,762,495 A | 8/1988 | Maloney et al. |
| 4,865,552 A | 9/1989 | Maloney et al. |
| 5,137,459 A | 8/1992 | Zirm |
| 5,868,580 A | 2/1999 | Amrein et al. |
| 5,893,719 A | 4/1999 | Radow |
| 6,306,155 B1 | 10/2001 | Chandler et al. |
| 6,485,142 B1 | 11/2002 | Sheehy et al. |
| 6,569,373 B2 | 5/2003 | Napadensky |
| 6,589,057 B1 | 7/2003 | Keenan et al. |

(Continued)

FOREIGN PATENT DOCUMENTS

| CN | 201893063 U | 7/2011 |
| WO | 2009006345 A1 | 1/2009 |

OTHER PUBLICATIONS

Bell Jr. et al., "Operative experience of residents in US General Surgery programs: A gap between expectation and experience", Ann Surg (2009) 249: 719-724.

(Continued)

*Primary Examiner* — Timothy A Musselman
(74) *Attorney, Agent, or Firm* — Fox Rothschild LLP

(57) ABSTRACT

A synthetic eye model includes an enclosed lens capsule, a removable cortex material within the lens capsule, and an outer support for the lens capsule. A synthetic eye model assembly includes an eye segment comprising a lens capsule and an outer support and a base for detachably engaging the eye segment. The synthetic eye model and assembly can be made by 3D printing. A method of practicing eye surgery and a method of making a three-dimensional synthetic tissue model of an anatomical tissue structure are also disclosed.

32 Claims, 20 Drawing Sheets

(56) References Cited

U.S. PATENT DOCUMENTS

| | | | |
|---|---|---|---|
| 6,887,083 B2 | 5/2005 | Umeyama et al. |
| 7,066,598 B2 | 6/2006 | Niven |
| 7,272,766 B2 | 9/2007 | Sakezles |
| 7,291,016 B2 | 11/2007 | Otto |
| 7,300,619 B2 | 11/2007 | Napadensky et al. |
| 7,371,069 B2 | 5/2008 | Johnson |
| 7,875,232 B2 | 1/2011 | Parsi et al. |
| 7,896,639 B2 | 3/2011 | Kritchman et al. |
| 7,896,653 B2 | 3/2011 | Nylen |
| 8,128,412 B2 | 3/2012 | Carda et al. |
| 8,137,111 B2 | 3/2012 | Carda et al. |
| 8,235,728 B2 | 8/2012 | Stoll et al. |
| 8,308,487 B2 | 11/2012 | Van Dalen et al. |
| 2003/0222406 A1 | 12/2003 | Capuchim |
| 2004/0097166 A1 | 5/2004 | Maddocks et al. |
| 2005/0181342 A1 | 8/2005 | Toly |
| 2008/0008391 A1 | 1/2008 | Geva et al. |
| 2008/0221677 A1 | 9/2008 | Alfaro |
| 2009/0004636 A1 | 1/2009 | Carda et al. |
| 2010/0209899 A1 | 8/2010 | Park et al. |
| 2011/0060446 A1 | 3/2011 | Ono et al. |
| 2011/0091855 A1 | 4/2011 | Miyazaki |
| 2012/0021397 A1 | 1/2012 | Van Dalen et al. |
| 2012/0214144 A1 | 8/2012 | Trotta et al. |
| 2013/0030524 A1 | 1/2013 | Akura et al. |

OTHER PUBLICATIONS

Materialise, "HeartPrint: 3D printing service for patient-specific cardiovascular anatomy", Retrieved on Aug. 22, 2013, from <http://biomedical.materialise.com/heartprint>.

"3D printed eyes are insanely cheap prosthetics and look perfect", Retrieved on Oct. 7, 2014, from <http://io9.com/3d-printed-eyes-are-insanely-cheap-prosthetics-and-look-1567297067> (4 pages).

"Eye holder", Retrieved on Oct. 7, 2014, from Globe-fixation system for animal eye practice (1 pages).

Mohammadi et al., "Globe-fixation system for animal eye practice", J Cataract Refract Surg. (Jan. 2011) 37(1):4-7.

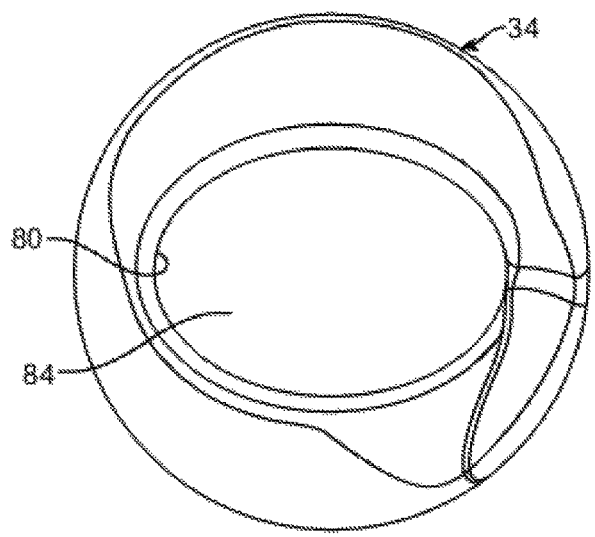
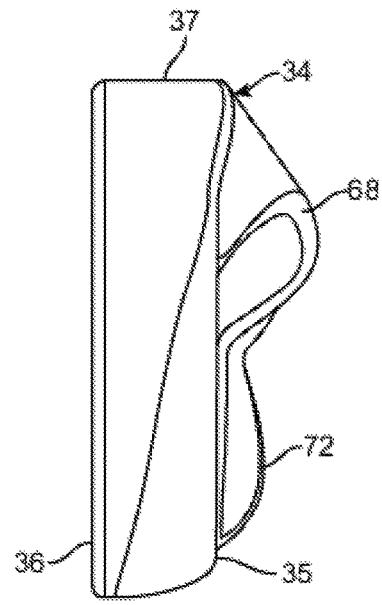
FIG. 15    FIG. 16
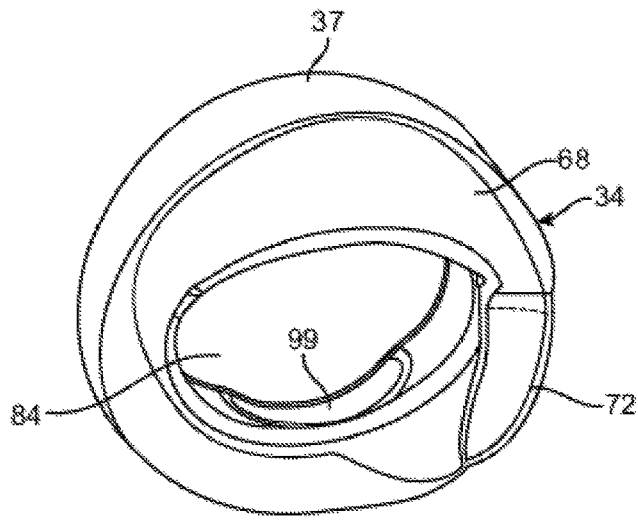
FIG. 17

SECTION A-A

METHOD FOR FABRICATING SIMULATED TISSUE STRUCTURES BY MEANS OF MULTI MATERIAL 3D PRINTING

CROSS REFERENCE TO RELATED APPLICATIONS

This application is a Continuation-in-Part of U.S. patent application Ser. No. 13/889,494 filed May 8, 2013 and a Continuation-in-Part of U.S. patent application Ser. No. 14/468,769 filed Aug. 26, 2014. This application also claims the priority of U.S. Provisional Application No. 61/644,248 filed May 8, 2012, and also claims the priority of Provisional Application Ser. No. 61/644,257 filed May 8, 2012, all of which are hereby incorporated in their entireties by reference.

FIELD OF THE INVENTION

This invention relates generally to anatomical models, and more particularly to anatomical models that are useful to practice surgical techniques.

BACKGROUND OF THE INVENTION

According to a study by the American Board of Surgery and the Association of Program Directors in Surgery, a graduating general surgeon should be competent to perform 121 "Level-A" procedures after a 5 year residency program. The same study shows the level of experience in these procedures for the 2005 graduating class of surgeons. The study found that for sixty-three (63) procedures, the mode (most commonly reported) experience was 0. In addition, there was significant variation between residents in operative experience for specific procedures. The study expresses concern about the adequacy of training of general surgeons in the United States and concludes that there is a need for methods to be developed to allow surgeons to reach a basic level of competence in less common procedures and also objective means to determine competency in the commonly performed procedures.

Many surgical techniques require dexterous movement and control by the surgeon. This dexterity cannot be developed by reading textbooks or watching instructional videos. Animal models or cadavers have been the default method for hands-on surgical training in the past, but they are costly, not readily available and may pose biohazard issues. Systems of computerized virtual reality or electromechanical devices may be useful and effective but their cost restricts their reach and thus their impact in the broader medical community. For training purposes, it is desired that the model stay as consistent and repeatable as possible, is readily available, and can be mass produced and distributed. In the field of ophthalmic surgery, there are several examples of creating a cataract surgery model in the prior art. However, some are over-simplified, such as U.S. Pat. No. 8,235,728 by Stoll, which describes a technique which may not be repeatable. Other methods are based on animal tissue, thus subject to inter and intra-species variability, high cost and availability see U.S. Pat. No. 6,887,083. Other methods like those described by Maloney U.S. Pat. No. 4,762,495, Radow in U.S. Pat. No. 5,893,719 and Carda U.S. Pat. Nos. 8,137,111 and 8,128,412 rely on the assembly of multiple parts and requires multiple manufacturing steps and tools to create a surgical model. U.S. Pat. No. 7,272,766 shows a method for forming tissue analogs.
3D Printing Additive manufacturing, known conventionally as 3D Printing (3DP), rapid prototyping (RP), Direct Digital Manufacturing (DDM), is the generic term used for technologies that use a layering process to build three-dimensional objects. In contrast to subtractive manufacturing, such as CNC machining, additive manufacturing achieves the desired form by depositing material in successive layers, as described in U.S. Pat. No. 7,896,639. The layer deposition is completely automated and control is derived from digital surface mesh files (.STL). These surface files can be generated by CAD (Computer Aided Design) software or obtained from medical imaging data such as CT or MRI with segmenting software.

A significant advantage of additive manufacturing is the possibility of printing different parts at once in a single "build". A build is a term used in the art of 3D printing to identify the end result of the printing process. This can be a single part, an array of identical parts, an array of different parts, and even an assembly of parts; this results in part assemblies without requiring any assembly process. No subtractive manufacturing method is capable of producing this level of complexity from a single process. A device with multiple components is usually assembled in a secondary operation from individual parts joined together by fasteners, glues, snaps, and the like.

Very recent advances in 3D printing technology allow for the creation of builds with discrete regions having customized mechanical properties. In other words, it is possible to print a single build that contains hard components or regions, soft components or regions, and components and regions with properties in-between. This is achieved by the simultaneous deposition of two complementary materials, one soft and one hard, in controlled proportions, in specific 3D coordinates. Similar to the way an office inkjet printer combines a discrete number of colors in the cartridge to create any color pixel on paper, a multi-material 3D printer combines materials to create any intermediate material on a voxel (3D pixel) of the build. The technology currently used to do this is based on what is known as "Polyjet" and is described in U.S. Pat. Nos. 6,569,373 and 7,300,619 from Napedensky and U.S. Pat. No. 7,225,045 from Gothait. Using multi-material 3D printing technology, one can print an assembly of multiple sub-structures, and each sub-structure can have a specific material property assigned to it. This was used by Parsi for the fabrication of hearing aids, as disclosed in U.S. Pat. No. 7,875,232. An example application of a surgical model of a flexible vessel made with rapid prototyping is shown in U.S. Pat. Pub. No. US2011/0060446 and U.S. Pat. Pub. No. US2010/0209899A1 and simulated abdominal wall in layers are shown in U.S. Pat. Pub. No. 2010/0209899.

SUMMARY OF THE INVENTION

A synthetic eye model can include an enclosed lens capsule, a removable cortex material within the lens capsule; and an outer support for the lens capsule. The lens capsule, cortex material and outer support can be printed by a 3D printing process. The lens capsule, removable cortex material, and outer support can comprise an eye segment.

A base can be provided for the eye segment. The base can comprise a structure for detachably engaging the outer support. The detachable engagement structure can comprise a flexible material with a central opening, the central opening having a diameter less than the diameter of the outer support. The detachable engagement structure can comprise a socket, the socket defining a back wall, a flexible socket protrusion and a space for receiving and securing the eye segment. An anterior portion of the base can be modeled after the anterior portion of a human orbit.

The outer support can have a hardness that is above Shore A 50. The capsule can have a hardness that is between Shore A 50 and Shore A 95. The cortex can have hardness below Shore A 20 or a tensile strength lower than 20 MPa or a flexural strength lower than 20 MPa and lower than the flexural strength of the lens capsule and the outer support. The removable cortex material can be at least 20% support material.

A circumferential ridge extending anteriorly from the outer support can be provided to represent the limbus. The model can further comprise a synthetic corneal button. The corneal button has a posterior edge and the circumferential ridge has an anterior edge. The posterior edge of the corneal button mates with the anterior edge of the circumferential ridge.

A synthetic eye model assembly can include an eye segment comprising a lens capsule and an outer support; and a base for detachably engaging the eye segment. The segment and base can be manufactured by a 3D printing process. The lens capsule can be filled with a removable support material.

The base can comprise a flexible material with a central opening. The central opening has a diameter less than the diameter of the outer support. The base can include a socket. The socket can define a flexible back wall, a flexible socket protrusion and a space for receiving and securing the eye segment. The flexible socket protrusion comprises flexible flaps. The flexible back wall of the socket can include a rigidifying member. An anterior portion of the base can be modeled after the anterior portion of a human orbit.

The outer support can have a hardness above Shore A 50. The capsule can have a hardness that is between Shore A 50 and Shore A 95. The cortex can have a tensile strength or a flexural strength lower than 20 MPa. The eye model can further comprise a circumferential ridge extending anteriorly from the outer support. The eye model can further comprise a synthetic corneal button, the corneal button having a posterior edge and the circumferential ridge having an anterior edge, the posterior edge of the corneal button mating with the anterior edge of the circumferential ridge. The eye segment can be an anterior eye segment.

A method of practicing eye surgery techniques on a model of the eye can include the steps of providing a synthetic eye model, comprising an enclosed lens capsule, a removable cortex material within the lens capsule, and an outer support for the lens capsule, wherein the lens capsule, cortex material and outer support are printed by a 3D printing process; and, practicing surgery on the synthetic eye model. The model can be of the anterior segment of the eye.

The method can further comprising a base for the eye model, where the base comprises structure for detachably engaging the outer support, and the method further comprises the step of detachably securing the synthetic eye model to the base. The anterior portion of the base can be modeled after the anterior portion of a human orbit, and the method can further comprise the step of practicing eye surgery while negotiating modeled structures of the human orbit. The model can further comprise a circumferential ridge extending anteriorly from the outer support, and a synthetic corneal button. The corneal button has a posterior edge and the circumferential ridge has an anterior edge. The posterior edge of the corneal button mates with the anterior edge of the circumferential ridge. The method further comprises the step of attaching the synthetic corneal button to the circumferential ridge.

The removable cortex material can be support material. The method can further comprise the step of practicing the removal of the synthetic cortex material from the capsule. The eye surgery can be cataract surgery.

A method of making a three-dimensional tissue model of an anatomical tissue structure, comprising the steps of:
  a) assembling data of the three dimensional tissue composition of the anatomical tissue structure, the data including anatomical tissue type and location within the three dimensional space occupied by the anatomical tissue structure;
  b) assigning to each anatomical tissue type a synthetic tissue type corresponding to each anatomical tissue type, each synthetic tissue type having a corresponding material property type,
  c) assigning to at least one material property type a blend of at least two 3D printing materials to create a 3D build file for the anatomical model;
  d) providing the 3D build file to a 3D printer; and,
  e) printing the anatomical model with the 3D printing materials according to the 3D build file.

The anatomical tissue types can include loose connective tissue/muscle, dense connective tissue, supportive connective tissue, and cellular tissue. The synthetic tissue type corresponding to loose connective tissue/muscle has a material property type with a hardness between Shore A 5 and Shore A 30; the synthetic tissue type corresponding to dense connective tissue has a hardness between Shore A 30 and Shore A 95; the synthetic tissue type corresponding to the supportive connective tissues has a hardness of Shore D 20 or greater, and the synthetic tissue type corresponding to cellular tissue has a hardness of less than Shore A 20. The anatomical tissue structure can be an anterior segment of an eye.

The material property type can be the tensile or flexural strength. The tensile or flexural strength is highest for the synthetic tissue type corresponding to supportive connective tissue, lower for synthetic tissue type corresponding to dense connective tissue, lower for synthetic tissue type corresponding to loose connective/muscle tissue, and lowest for synthetic tissue type corresponding to cellular tissue.

A method of practicing surgery on an anatomical tissue structure, can comprise the steps of:
  assembling data of the three dimensional tissue composition of the anatomical tissue structure, the data including anatomical tissue type and location within the three dimensional space occupied by the anatomical tissue structure;
  assigning to each anatomical tissue type a synthetic tissue type to corresponding to each anatomical tissue type, each synthetic tissue type have a corresponding material property type,
  assigning to at least one material property type a blend of at least two 3D printing materials to create a 3D build file for the anatomical model;
  providing the 3D build file to a 3D printer;
  printing the anatomical tissue model with the 3D printing materials according to the 3D build file; and
  practicing surgery on the anatomical tissue model.

A synthetic eye model for practicing surgery can include an artificial lens cortex material, a capsule surrounding the lens cortex material and defining anterior and posterior sides, and a circumferential lateral side, and an annular engagement rim extending radially outwardly from the circumferential lateral side. The engagement rim comprises a stiffening material having a hardness greater than that of the lens cortex material and the capsule. A base includes an annular wall having interior and exterior faces. The interior face includes a circumferential groove dimensioned to receive the engagement rim.

The engagement rim further can include a flexible material with a hardness less than that of the stiffening material. The stiffening material can have a hardness above 20D Shore. The flexible material can have a hardness less than 95 A Shore. The annular wall can comprises material less than 95 A Shore. A posterior portion of the annular wall can comprise material greater than 20D Shore.

The engagement rim can include a circumferentially distributed rigid support comprising the stiffening material. The rigid support can include a support ring. The rigid support can include a plurality of support projections extending radially outwardly from the support ring.

The artificial lens cortex material, the capsule, and the annular engagement rim can be monolithic and comprised entirely of 3D printed materials.

The base can include an anteriorly extending circumferential flange. The anteriorly extending flange can have a hardness less than 95 A Shore. The synthetic eye model can further include a synthetic corneal button. The corneal button having a posterior surface and the circumferential flange can have an outer surface, and the posterior surface of the corneal button can mate with the outer surface of the circumferential flange. The circumferential flange can include an aperture.

The capsule can have a hardness that is below 95 A Shore. The cortex material can have a tensile strength or a flexural strength lower than 20 MPa and lower than the tensile strength or flexural strength of the capsule and the annular engagement rim. The cortex material can comprise at least 20% 3D printing support material.

The base can include an aperture. The capsule can include an aperture. The synthetic eye model can further include an optical lens. The optical lens can have an optical power of from 0 diopters to 100 diopters. The optical lens can be detachable. The optical lens can have an outer surface and the circumferential flange can have an interior surface, where the outer surface of the optical lens elastically mates with the interior surface of the circumferential flange A method of practicing surgery includes the steps of providing a synthetic eye model for practicing surgery, comprising an artificial lens cortex material, a capsule surrounding the lens cortex material and defining anterior and posterior sides, and a circumferential lateral side, an annular engagement rim extending radially outwardly from the circumferential lateral side, the engagement rim comprising a stiffening material having a hardness greater than that of the lens cortex material and the capsule. A base is provided comprising an annular wall having interior and exterior faces, and the interior face comprising a circumferential groove dimensioned to receive the engagement rim. The method further includes the step of practicing surgery on the synthetic eye model.

The base can further include an anteriorly extending circumferential flange, and the method can include creating an incision in the circumferential flange. The method can further include the step of inserting an instrument through the incision, creating a tear in the capsule. The method can include the step of removing cortex material from the capsule through the tear. An intraocular implant can be inserted into the capsule after cortex material has been removed from the capsule.

The method can include the step of providing an aperture in the posterior side of the capsule. An optical lens can be attached to the circumferential flange. An incision can be created in the annular wall of the base, and an instrument can be inserted through the incision to practice surgical procedures posterior to the capsule.

The method can further include the step of removing the capsule and annular engagement rim after practicing surgery, and replacing it with another artificial lens cortex material, capsule, and annular engagement rim.

BRIEF DESCRIPTION OF THE DRAWINGS

There are shown in the drawings embodiments that are presently preferred it being understood that the invention is not limited to the arrangements and instrumentalities shown, wherein:

FIG. 15 is a plan view of the outer support structure of the base without a socket.
FIG. 16 is a side elevation.
FIG. 17 is a perspective view.

DESCRIPTION OF THE INVENTION

Figure 1:
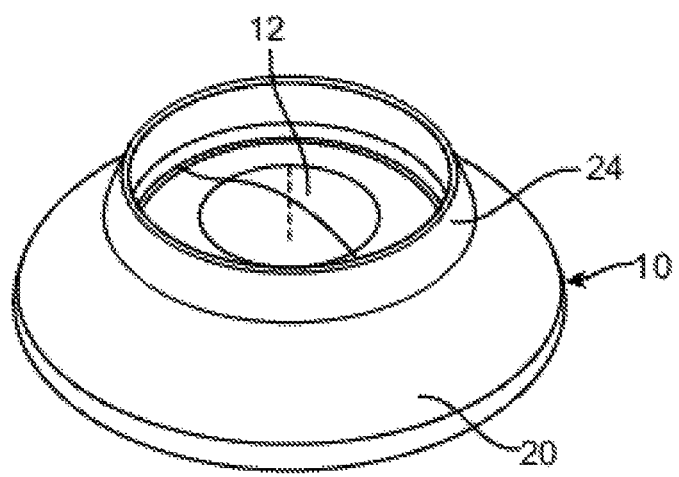
FIG. 1 is a perspective view of an eye model according to the invention
Figure 2:
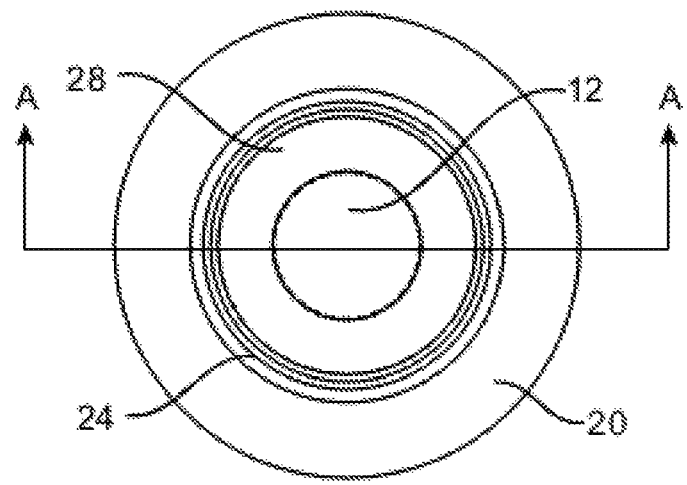
FIG. 2 is a plan view.
Figure 3:
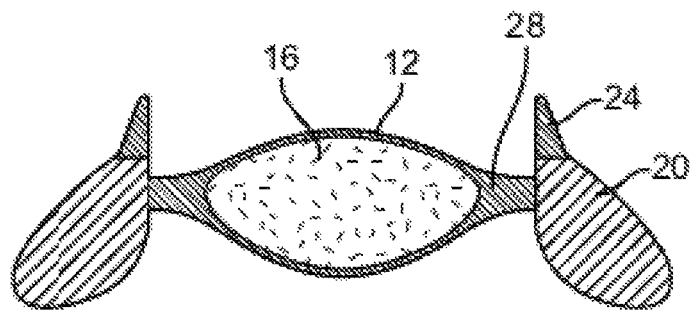
FIG. 3 is a cross section taken along line A-A in FIG. 2.
Figure 4:
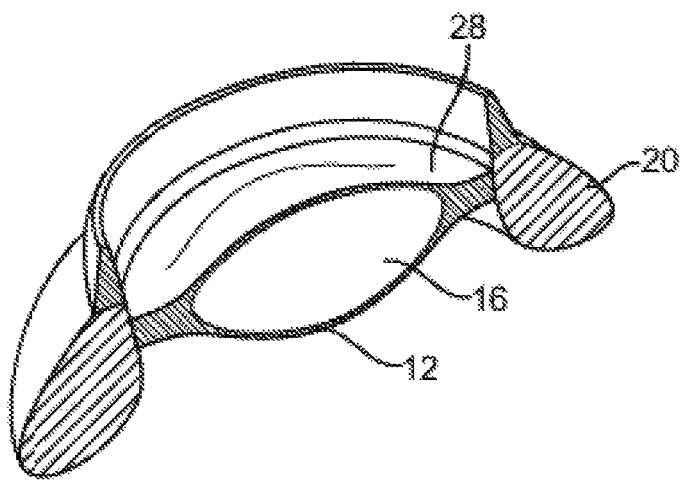
FIG. 4 is a perspective view broken away.

This invention relates to a method to create devices which mimic the mechanical properties of tissue structures and their pathologies, for surgical training, demonstration, teaching aids or surgical instrument calibration, validation and research and development. The invention is directed particularly to the development of a surgical model of the anterior segment of the eye, to serve as a model for cataract surgery. Other applications using the same principle may include but are not limited to: joint models for arthroplasty; cardio-vascular models for cardiac surgery; spinal models for spinal surgery; models for craneo-facial surgery such as cleft palate; crash test dummy components; and ballistic impact models.

Tissue

The human body, as well as any other organism, is a natural "assembly" of multiple sub-structures having different mechanical properties; hard bones, soft muscles, tough membranes, elastic skin and many others. These sub-structures are called tissues. There are four (4) general classes of tissue: epithelial, neural, muscular and connective. Nervous tissue makes up the brain, spinal cord and the nerves. Epithelial tissue constitutes the cellular layers that cover external and internal surfaces of the body, and make up glands. Muscular tissue constitutes the skeletal, cardiac and smooth muscle types. Muscle tissue is composed mainly of specialized cells that contract. Connective tissue encompasses all other tissues that are not epithelia, neural or muscular. Connective tissue forms the framework of the body. It provides structure in the form of bones and cartilage. It protects, contains and divides other tissues in the form of fat and membranes. It transmits and anchors muscle power in the form of tendons and ligaments. It also makes up fluids in the form of blood and lymph and helps contain and transport them in the form of veins and arteries.

Materials

Connective tissues can be seen as a composite material: specialized cells are the "filler" of a "matrix" made of extracellular protein fibers and ground substance. Whereas cells make up the bulk of epithelial, muscular and nervous tissue, the matrix typically accounts for most of the volume of connective tissue.

Except for fluid connective tissue, such as blood and lymph, the matrix can be mechanically simplified as being made of two materials, collagen and elastin. Collagen is the material that confers strength and elastin is the material that confers elasticity. The proportion of elastin and collagen type fibers in a tissue's matrix can be related to its mechanical properties. Tissue structures predominantly made of collagen are tough and rigid. Tissue where elastin predominates is more elastic.

Current three dimensional printing technology allows the three dimensional printing of a mixture of an elastic and a rigid material, allowing builds or assemblies containing sub-structures with hardness values between low values of less than Shore A 25 to harder or rigid materials having a Shore D hardness of 85 or more. An example of such technology is the Connex™ machines (Objet Geometries Ltd of Rehovot Israel). Shore hardness and other material property values are determined by suitable methods, such as in the case of Shore hardness, ASTM 2240, for example. Hardness values in the SHORE A and SHORE D scales enable modeling of the mechanical properties of tissue, especially of connective tissue proper, supporting connective tissue and muscle tissue.

The Connex™ multi-material 3D printing process uses a "Support" material (Fullcure 705), in addition to rigid materials such as VeroWhitePlus™ and elastic materials such as TangoPlus™. In the art of 3D printing "Support" material is used to support any overhanging features, and to fill cavities of the model so that it remains as a solid and continuous block during the printing process; this allows for the layers to be deposited and supported on a continuous surface. The support material in prior 3D manufacturing processes is designed only to be washed, dissolved, or otherwise removed in a secondary operation, so that only the intended model remains. This is achieved by making the support material significantly weaker than model materials.

The support material used in the disclosed embodiments is a material with significantly less strength than the model materials, and is described in U.S. Pat. No. 7,300,619. This weak and removable material is used as a functional part of the disclosed invention to simulate cellular and mechanically weak forms of tissue such as organ parenchyma, neural tissue, epithelial tissue and pathological tissues like a cataract of the crystalline lens cortex. These tissues are usually enveloped in a membrane of connective tissue. These enclosing membranes are modeled in the form of a closed bag or capsule and their internal volume is automatically filled by support material during the printing process, hence, the support material will be fully enclosed within the membrane when the structure has been printed. This can effectively simulate a cataract inside a lens capsule, or the parenchyma of an organ inside its serous membrane.

The method of the invention uses multi-material three dimensional printing technology to manufacture surgical models that convey both the form and the mechanical properties of the tissues represented. The invention disclosed enables the mass production of repeatable and highly customizable synthetic tissue models, which are useful in the medical training field to develop instruction protocols, standardize assessment of surgical technique proficiency and test new surgical techniques or instruments before going into an animal model or patient. The method is also suitable to make custom, one-of-a-kind models for the purposes of surgical planning of special cases. The method proposed in one embodiment can be used to create a model of the anterior segment of the eye to practice existing or develop new capsulorhexis methods and instruments. An example of a method that can be practiced is the Continuous Curvilinear Capsulorhexis ("CCC") which is described in U.S. Pat. No. 6,306,155.

The invention enables the 3D printing of surgical models that simulate the mechanical properties of the different tissues involved. This is useful for surgeries requiring a variety of techniques such as incisions, resections, punctures, sutures, shearing, drilling, clamping, grinding, peeling, tearing, spreading, and the like, such as those encountered in orthopedics, craneo-facial and plastic surgery, open heart surgery, and ophthalmic surgery such as cataract surgery amongst others.

SURGICAL MODEL GENERATION METHOD. The following method can be used to create a surgical model for a procedure done on an anatomical structure.

1. Establish target tissues: those tissue structures manipulated or dissected in surgery (being cut, sutured, folded, separated among others). These structures need to have material properties that closely mimic those tissues being represented.
2. Establish auxiliary structures. These are structures or features to orient surgeon by providing additional geometrical and anatomical landmarks of the anatomical form being represented by the model. These structures are not directly subject to the surgical procedure.
3. Establish optional structures. These are structures representing surrounding tissues that are not critical for the model to function. They serve to provide additional realism and or an additional challenge, and can be made to be detachable if not critical. It is understood that the more structures there is, the more realistic the model will be, but less cost effective.
4. Determine/segment anatomical geometry. Each identified target tissue and at least portions of auxiliary structures should be designed with scale and proportions that closely resembles the tissues being represented. Information or average dimensions can be obtained from anatomy literature. Software segmenting of anatomical data can also be used. This process converts medical imaging data (such as DICOM) into point cloud or surface type file formats (such as .STL). These techniques are known in the art of medical modeling. There is available commercial software to do this, such as MIMICS (Materialize, Belgium). Imaging methods that can be used to obtain anatomical data information include: Computerized tomography (CT), Cone beam computed tomography (CBCT), Magnetic resonance imaging (MRI), Magnetic resonance angiography (MRA), Ultrasound, Positron Emission Tomography (PET), Single Photon Emission Tomography (SPECT), Optical Coherence Tomography (OCT), Radiographs, cephalometry, stereoradiography, photography, photogrammetry, holography, Infrared Photogrammetry, Photometric stereo, laser surface scanning, and any other suitable technique that provides anatomical information.
5. Generate 3D CAD editable files: Tissue anatomy information derived from the medical and biological literature can be approximated by designing it in 3D CAD as a parametric solid. Another method is to use computer segmentation software to extract tissue geometry into surface files that can be imported and edited in a Computer Aided Design (CAD) environment. Data from the previous step (as surface data) can be used directly for 3D printing, however several optimizations are possible within a CAD environment.
   Optimize Model Geometry: In a CAD type environment, the different tissue files can be combined into an "Assembly" or multiple sub-assemblies, where each tissue can be located and edited with respect to the other tissues to form the model.
   Geometrical Optimizations: Several modifications can be made to each tissue file, including repairing, resizing, adding or subtracting to it. Tissues can be simplified into a parametric form (deterministic), which allows iterations to be easily made around the basic geometry and modification of some non-critical dimensions to improve manufacturability. Some general areas of optimization include: geometry repair, boundary repair, encapsulation (since capsules and membranes cannot usually be resolved by most medical imaging methods). Adding accessory features to auxiliary structure geometry can provide added functionality to enhance or couple the model to optional auxiliary structures or to other devices. For example, adding mating structures so the model can be attached to removable auxiliary structures, a test bench, a medical simulator mannequin, or to add ports for sensors, and other such structures.
   Assembly Optimizations: Optimizations to the design can be made in order to group and separate structures into 2 or more separate sub-assemblies. This allows modularity of the model, allows the addition or replacement of target tissues and allows for optional auxiliary structures to be added at a later tune, or may be beneficial for any other manufacturing, assembly, commercial, geometrical or economic reason. Optional auxiliary structures can be removable, in order to make the model modular and more cost effective.
6. Create surfaces mesh files for 3D printing: Each tissue represented in the CAD assembly is converted into a surface mesh file, readable by three dimensional printers, such as .STL.
7. Assign durometer value to surface meshes. Each tissue mesh is assigned a Shore hardness value via three dimensional printing software, such as ObjetStudio V9 (Objet, Rehovolt, Israel) to create a "build file" having geometrical information and material property type information. A guideline to the hardness property values to be applied to each mesh depending on tissue type represented is set forth below:
   a. Loose connective tissue; Muscle: Shore A 5-40
      i. Sub-cutaneous cellular structure, Adipose tissue, areolar connective tissue: Shore A 10 or less.
      ii. Reticular Tissue/Stroma: Shore A 10-30.
      iii. Smooth muscle, Skeletal muscle, Cardiac muscle: Shore A 10-40
   b. Dense connective tissue: Shore A 30-95
      i. Elastic tissues: Ligaments, skin, Vessel walls: Shore A 20-60
      ii. Membrane group: Serous membranes, Deep Fasciae, Synovial membranes: Shore A 50-95
      iii. Tendons, Aponeurosis, Intervertebral disc: Shore A 60-95
      iv. Sclera, Cornea: Shore A 30-70
      v. Lens Capsule: Shore A 60-95
   c. Supportive connective tissues: Shore D 20 and above.
      i. Cartilage: Shore D 20-60
      ii. Bone: Shore D 60 and above.
   d. Cellular tissue: Neural tissue, Epithelial tissue, Parenchyma and other predominantly cellular tissues (except muscle). Support material is used for these tissues, and in one embodiment has a hardness of Shore A 20 or less. Examples include:
      i. Organ bulk (Parenchyma): support material enveloped in a membrane)
      ii. Lens Cortex/Cataract: support material enveloped in a capsule iii. Glands: support material enveloped in a membrane
iv. Mucous, Epithelial and Endothelial layers: support material film
8. Multi-Material 3D printing: Print the build file in a multi-material 3D printer with a combination of a hard material (A), elastic material (B), and a weak support material (C), or some combination of these, such as printing in the CONNEX™ printer with VeroWhitePlus™, TangoPlus™ and FullCure 705™ Support from Objet geometries (Rehovolt, Israel).
9. The geometry and material composition can then be fine-tuned by testing iterations of the model until results are satisfactory.

Creation of a Cataract Model

The invention describes synthetic models that allow surgeons to demonstrate and/or practice a specific surgery, by presenting the surgeon with the major challenges during that particular type of surgery. A surgical model of the anterior segment of the eye made according to the invention will present the surgeon with the most common challenges of a cataract surgery. These challenges include port creation, capsulorhexis, cataract removal, and insertion and deployment of an intraocular lens (IOL).

Step 1: Establish Target Tissues:

The target tissues are those tissues that are subject to a surgical operation. In a basic cataract surgery these tissues are the limbus, the lens capsule and the lens cortex or cataract. Usually, access ports are made by creating incisions with an ophthalmic bevel slit knife on the corneal limbus, which can be defined as an annular ring of tissue at the base of the cornea connecting it to the sclera. Surgical instruments are inserted and manipulated through the ports. A Continuous Curvilinear Capsulorhexis (CCC) can be created on the lens capsule by first puncturing with a sharp instrument such as a preformed hypodermic needle and then torn with micro-forceps. Fragmenting and extraction of the lens cortex (cataract) can be done by phacoemulsification, hydrodissection or other mechanical action to disintegrate and remove the cataract fragments through the capsulorhexis. An Intra-Ocular Lens (IOL) is delivered through the port in the limbus into the empty capsule. The model must simulate the target tissues involved in cataract surgery with enough detail to present these challenges.

Step 2: Establish Auxiliary Structures

Even though the surgical procedure is only performed on the tissues identified in Step 1, these tissues require a framework that positions them in space, supports them, and helps the surgeon make sense of the anatomical structure being represented by the model. This is achieved by adding auxiliary structures. Since auxiliary structures do not play an active role in surgery, meaning that the surgeon does not need to manipulate them with instruments, their geometries can be tailored to play a more supportive role in terms of the model's structure and simplified to reduce size and material costs. Since all the target tissues involve the anterior segment of the eye, the model can be simplified to represent this section of the eye.

To be able to accurately position the target structures in space and provide anatomical sense to the model, the minimum structures would be the following:

1—The Sclera. A scleral section or ring, at the level of the lens is used to provide a frame of reference, and structural support for the model. Since the limbus is a continuation of the sclera, the limbus is attached and referenced to this structure.

2—A Zonule. This structure is an annular ring representing the suspensory ligaments of the lens. This structure is required to connect the capsule to the scleral ring.

Step 3: Establish Optional Auxiliary Structures

1—Orbit: Surrounding Bony structure (Optional). The bony structure around the eye, including the orbit (eye-socket), the nasal bones and the brow may add additional realism to the surgical model, since the surgeon is required to manipulate the instruments around these features.

2—Orbital Fat (Optional). Between the orbit bone and the eye-globe there is fatty tissue that acts as packing material and shock absorber for the eye. This would further increase the realism of the model by simulating a pliable foundation nesting the eye.

STEP 4: Determine/Segment Anatomical geometry: The anatomical dimensions for target tissues are based on the medical and biological literature: Lens biometry information can be found in the medical literature. Corneal diameter and limbus thickness can be found in the medical literature. The relative positions can derived from the medical literature, and alternatively from medical imaging techniques such as Optical Coherence Tomography (OCT), MRI or CT. From OCT data, the proportions and spatial arrangement of the lens and limbus can be derived. The orbit and bony structure is an example of a non-deterministic shape that can be extracted by segmenting medical tomographic volumes, such as CT or MRI.

Step 5: Generate 3D CAD Files:

The OCT image and the dimensions from the literature and the medical images are used to parametrically design and position the target tissues. Auxiliary features are added to support the target tissue models and in agreement with the anatomical information. The main features of the segmented orbit surface are reproduced in a parametric CAD model. The eye model can then be added in relation to the bony structure according to the segmented data. A model of the space between the globe and the orbit is made to represent the Orbital fat.

Step 6: Optimize Model Geometry.

The capsule was optimized for manufacturing, since the capsule anatomical thickness is around 5-20 microns, but currently available commercial 3D printers cannot produce such thin walls. The capsule thickness is gradually incremented in an iterative feedback loop until the 3D printing process is successful (50 microns is what is consistently obtained with current technology). Another optimization applied to the model is the merging of the lens capsule and zonule bodies into one single body, since they can share durometer value for purposes of the model. Another possible optimization is to make the non-critical or optional auxiliary structures detachable. In another embodiment of the invention the orbit and fat structures can be removable. The main steps of cataract surgery can be performed on the eye model itself, but the orbit and fat bodies add another layer of realism.

STEP 7: Generate surface meshes for each tissue type: An individual mesh is then generated for each tissue type by the CAD software.

Step 8: Assign Durometer Values

Durometer values are assigned to the tissue meshes to generate the 3D build file according to the tissue types as follows:

LIMBUS: Dense connective: Shore A 30-70
LENS CAPSULE: Dense connective: Shore A 60-95
LENS CORTEX: Cellular tissue type: Support material Assign Values to Auxiliary Structures ZONULE: Dense connective: Shore A 60-95 (Same as capsule)

SCLERA: Dense connective: Shore A 60 and above.

Assign Values to Detachable Auxiliary Structures.

ORBIT (Bone): Supportive connective: Shore D 60 and above

ORBITAL FAT: Loose connective tissue: Shore A 5-40

Step 8: Multi-Material 3D Printing

The structures can now be printed in the corresponding durometer values using a Multi-Material 3D printer, such as the Objet Connex. Materials used can be VeroWhitePlus™ as a rigid material, TangoPlus™ used as an elastic material, and FullCure 705™ used as support material. However, other materials both in existence and which might be available in the future can be used, including collagen and elastin based materials.

Step 9: Testing.

Geometry and durometer values can be refined by a testing feedback loop according to the specific need.

Generalization of Concept Considering 3D Printing Evolution.

Current 3D printing technology only allows the automatic combination of two materials, and the use of a third material as support. However the ability to combine the three materials (which could be available in the future using the same Polyjet principle), can provide a better control over the tissue properties. The model of the invention can be a combination of at least 3 materials, A, B and C. A being rigid and strong, B being elastic and soft, and C being weak or non-cohesive.

Most materials can be qualitatively represented by its stress strain curve. The curve will provide information about the material's elastic deformation properties, and yield and fracture strengths. Thus a material's behavior can be approximated and simulated by recreating its elasticity and strength.

Strong materials such as, for example and without limitation, Objet VeroWhitePlus™ are qualitatively equivalent to an idealized Material A. An increase in the percent composition of this material increases hardness, stiffness and yield strength.

Elastic materials such as, for example and without limitation, TangoPlus™ are qualitatively equivalent to an idealized Material B. This material confers elasticity which is the physical property that quantifies the ability of a material to return to its original shape after the stress is removed. As elasticity increases, Young's modulus generally decreases. An increase in the percent composition of this material decreases hardness and increases flexibility.

Weak or non-cohesive materials, such as, for example and without limitation, Fullcure 705™, are qualitatively equivalent to an idealized material C. An increase in the percent composition of this material should decrease the object toughness, tensile strength and shear strength which relate to the amount of energy required to cause fracture or permanent deformation. An increase in the percent composition of this material would increase fragility and decrease cohesiveness, which is a property usually used with composites. A non-cohesive structure will tend to crumble instead of fracture.

Anatomical features can be modeled by mixtures of A, B and C. Material A confers strength properties, Material B confers elastic properties, and material C affects cohesive properties. The more of A that is present in a given mixture, the higher the yield and fracture strengths. In other words, the more stress or force it can withstand before deforming and subsequently fracturing. The more of B there is on a mixture, the larger the strain the material can resist before permanently deforming. The more of C in a mixture, the easier the material yields/fractures permanently under tensile or shear stress.

The technology of 3D printing is moving towards printing organic matter and "tissue", mainly cells on a scaffold of collagen and elastin. The invention would be applicable to such technologies, where A is collagen, B is elastin and C is cells.

A synthetic eye model can include an enclosed lens capsule, a removable cortex material within the lens capsule, and an outer support for the lens capsule. The lens capsule, cortex material and outer support can be printed by a 3D printing process. The model can be of the anterior segment of the eye.

The synthetic eye model can further comprise a base for the synthetic eye model. The base comprises structure for detachably engaging the outer support. The detachable engagement structure can comprise a central opening, the central opening having a diameter less than the diameter of the outer support. The detachable engagement structure comprises a socket comprising a flexible protrusion or flap, and the socket can comprise a back wall. The flexible protrusion and the back wall define a space for receiving and securing the synthetic eye model. The socket can be made of a material that is Shore A 40 or less. The base can comprise a structure for attaching the base to a surface.

The base can be modeled after the anterior portion of a human orbit. This can include nasal and brow bones. This will permit the surgeon to practice working around these structures during the eye surgery. The base can be made of a material with a hardness of Shore D 20 or greater. Other such auxiliary structures to increase realism of the surgical experience are possible.

The outer support of the eye model can have a durometer hardness value above Shore 60 A. The outer support is circumferential. The capsule can have a durometer value between Shore A 60 and Shore A 95. The capsule can have a hardness that is at least Shore A 50. The capsule can have a hardness that is Shore A 50-100. The cortex hardness is less than Shore A 20. The cortex can have a tensile strength or a flexural strength lower than 20 MPa.

A circumferential ridge can extend anteriorly from the outer support. The circumferential ridge can extend anteriorly for from 1 to 3 mm. The thickness of the circumferential ridge can be, for example, from 0.3 to 1.5 mm. The circumferential ridge can have a hardness from Shore A 30-70.

The eye model can comprise a detachable synthetic corneal button. The corneal button can have a posterior edge and the circumferential ridge can have an anterior edge. The posterior edge of the corneal button can mate with the anterior edge of the circumferential ridge. The surgeon can practice attaching the corneal button to the circumferential ridge, which in this embodiment mimics the limbus.

The removable cortex material can be entirely support material. The removable cortex material can be at least 10%, 20%, 30%, 40%, 50%, 60%, 70%, 80%, or 90% support material.

The synthetic eye model can further comprise a zonule. The zonule can have a hardness of at least Shore A 50.

The synthetic eye model can further comprise a material approximating orbital fat. This will provide realism to the model in the way that the eye model responds to applied pressure.

The synthetic eye model can comprise detachable components. These can include the base, or other structures which lend realism to the model even if not directly applicable to the surgical procedure.

A method of practicing eye surgery techniques on a model of the anterior segment of the eye, can include the steps of providing a synthetic eye model, comprising an enclosed lens capsule, a removable cortex material within the lens capsule, and an outer support for the lens capsule; and practicing surgery on the synthetic eye model. The lens capsule, cortex material and outer support can be printed by a 3D printing process. The model can be of the anterior segment of the eye.

The synthetic eye model can further comprise a base for the synthetic eye, the base comprising a structure for detachably engaging the outer support. The method further comprises the step of detachably securing the synthetic eye model to the base. The base can in part be modeled after the anterior portion of a human orbit, the method further comprising the step of practicing eye surgery while negotiating modeled structures of and around the human orbit.

The eye model can further comprise a circumferential ridge extending anteriorly from the outer support, and a synthetic detachable corneal button. The corneal button can have a posterior edge and the circumferential ridge can have an anterior edge, where the posterior edge of the corneal button mates with the anterior edge of the circumferential ridge. The method can further the step of practicing attaching the synthetic corneal button to the circumferential ridge. The removable cortex material can be support material, and the method can further comprise the step of practicing the removal of the synthetic cortex material from the capsule. The eye surgery can be cataract surgery.

A method of making a three-dimensional tissue model of an anatomical tissue structure, can include the steps of
  a) assembling data of the three dimensional tissue composition of the anatomical tissue structure, the data including anatomical tissue type and location within the three dimensional space occupied by the anatomical tissue structure;
  b) assigning to each anatomical tissue type a synthetic tissue type corresponding to each anatomical tissue type, each synthetic tissue type having a corresponding material property type,
  c) assigning to at least one material property type a blend of at least two 3D printing materials to create a 3D build file containing geometric and material property type information for the anatomical model;
  d) providing the 3D build file to a 3D printer; and,
  e) printing the anatomical model with the 3D printing materials according to the 3D build file.

The anatomical tissue types include loose connective tissue/muscle, dense connective tissue, supportive connective tissue, and cellular tissue.

The synthetic tissue type corresponding to loose connective tissue/muscle can have a material property type with a hardness between Shore A 5-40. The synthetic tissue type corresponding to dense connective tissue can have a hardness between Shore A 30-95. The synthetic tissue type corresponding to the supportive connective tissues can have a hardness of Shore D 20 or greater. The synthetic tissue type corresponding to cellular tissue can have a hardness of less than Shore A 20. The synthetic tissue type corresponding to cellular tissue can have a tensile strength or a flexural strength lower than 20 MPa.

The loose connective tissue type can include sub-cutaneous cellular structure, adipose tissue, areolar connective tissue, reticular tissue, and stroma. The muscle tissue type can include smooth muscle, skeletal muscle, and cardiac muscle. The dense connective tissue type can include elastic tissue, membranes, tendons, aponeurosis, intervertebral discs, sclera, cornea, and lens capsule. The elastic tissue type can include ligaments, skin, and vessel walls. The membrane tissue type can include serous membranes, deep fascia, and synovial membranes. The supportive connective tissue type can include cartilage and bone. Other tissues can be modeled.

The cellular tissue type can include neural tissue, epithelial tissue, organ parenchyma, lens cortex, glands, mucous membranes and epithelial and endothelial layers.

The 3D printing materials can include at least one rigid material, at least one elastic material, and at least one support material. The rigid printing materials can include at least one selected from the group consisting of VeroWhitePlus™ (RGD835), VeroWhite™, VeroBlackPlus™ (RGD875) VeroBlack™, VeroBlue™ (RGD840), High Temperature (RGD525™), VeroClear™ (RGD810), RGD720™, DurusWhite™ (RGD430), VeroGray™ (RGD850). The elastic printing materials can include at least one selected from the group consisting of TangoPlus™ (FLX 930), TangoBlack™ (FLX973), TangoBlackPlus™ (FLX980), TangoGray™ (FLX 950). The support material can include FullCure 705™ Support. (Objet Geometries/Stratasys, Rehovot Israel) Other 3D printing materials now known or developed in the future can be used.

The material property type that is used to determine and select appropriate 3D printing materials can be the modulus of elasticity. The modulus of elasticity is highest for the synthetic tissue type corresponding to supportive connective tissue, lower for synthetic tissue type corresponding to dense connective tissue, lower for synthetic tissue type corresponding to loose connective/muscle tissue, and lowest for synthetic tissue type corresponding to cellular tissue.

The material property type that is used to determine and select appropriate 3D printing materials can be the shear modulus. The shear modulus is highest for the synthetic tissue type corresponding to supportive connective tissue, lower for synthetic tissue type corresponding to dense connective tissue, lower for synthetic tissue type corresponding to loose connective/muscle tissue, and lowest for synthetic tissue type corresponding to cellular tissue.

The material property type that is used to determine and select appropriate 3D printing materials can be the tensile or flexural strength. The tensile or flexural strength is highest for the synthetic tissue type corresponding to supportive connective tissue, lower for synthetic tissue type corresponding to dense connective tissue, lower for synthetic tissue type corresponding to loose connective/muscle tissue, and lowest for synthetic tissue type corresponding to cellular tissue.

A method of practicing surgery on an anatomical tissue structure, can include the steps of:
  a) assembling data of the three dimensional tissue composition of the anatomical tissue structure, the data including anatomical tissue type and location within the three dimensional space occupied by the anatomical tissue structure;
  b) assigning to each anatomical tissue type a synthetic tissue type corresponding to each anatomical tissue type, each synthetic tissue type having a corresponding material property type,
  c) assigning to at least one material property type a blend of at least two 3D printing materials to create a 3D build file for the anatomical model;
  d) providing the 3D build file to a 3D printer; and, e) printing the anatomical tissue model with the 3D printing materials according to the 3D build file; and, f) practicing surgery on the anatomical tissue model.

There is shown in FIGS. 1-4 an eye model 10 according to the invention. The eye model 10 has a lens capsule 12 that is filled with a cortex material 16. The eye model 10 can further have an outer support 20. The outer support 20 can be connected to the capsule by a zonule 28. The cortex material 16 can be a support material as used in 3-D printing manufacturing processes. Other structures such as a circumferential ridge 24 can be provided to simulate the limbus for practicing surgical procedures.

Figure 5:
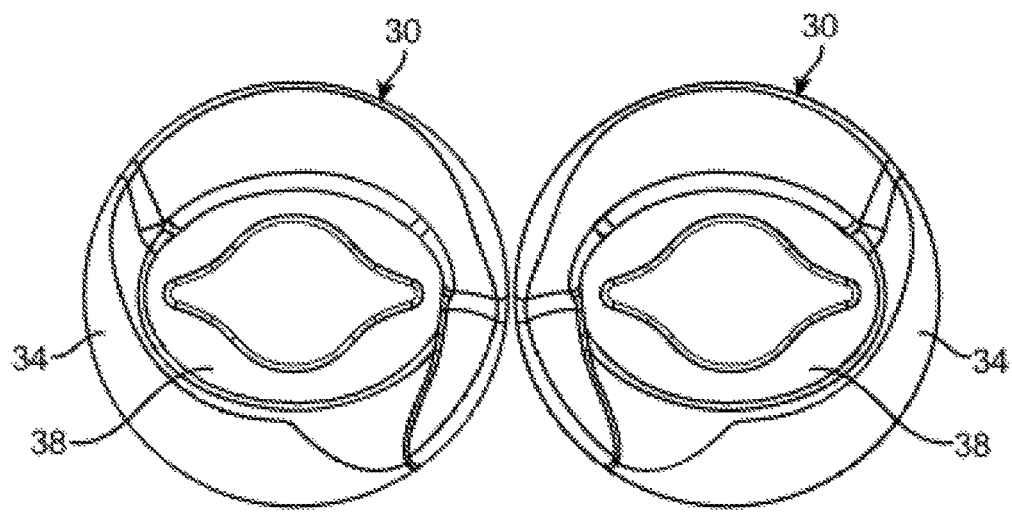
FIG. 5 is a plan view of a right and a left base for the eye model.
Figure 6:
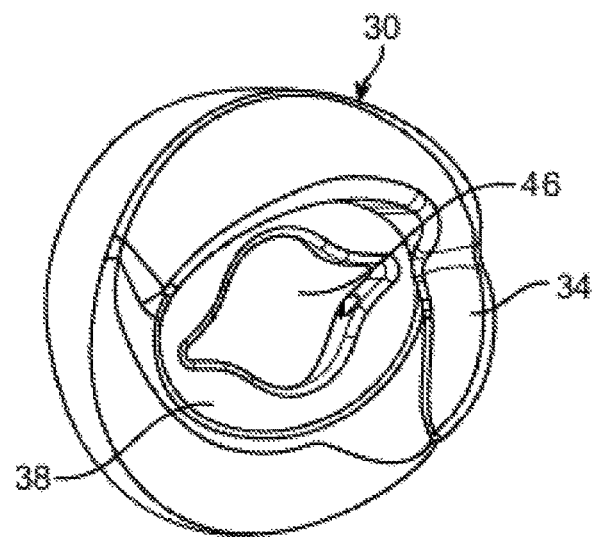
FIG. 6 is an alternative perspective of a base for the eye model.
Figure 7:
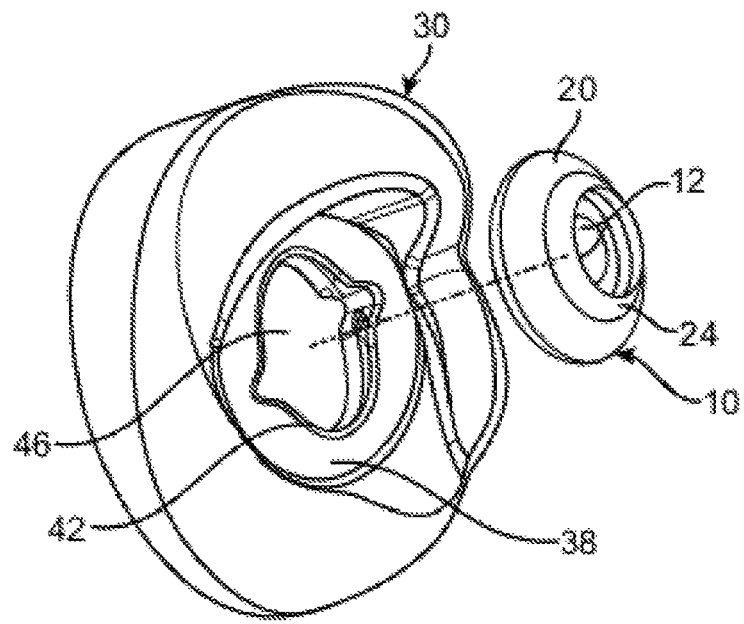
FIG. 7 is an exploded view of an eye model and a base.
Figure 8:
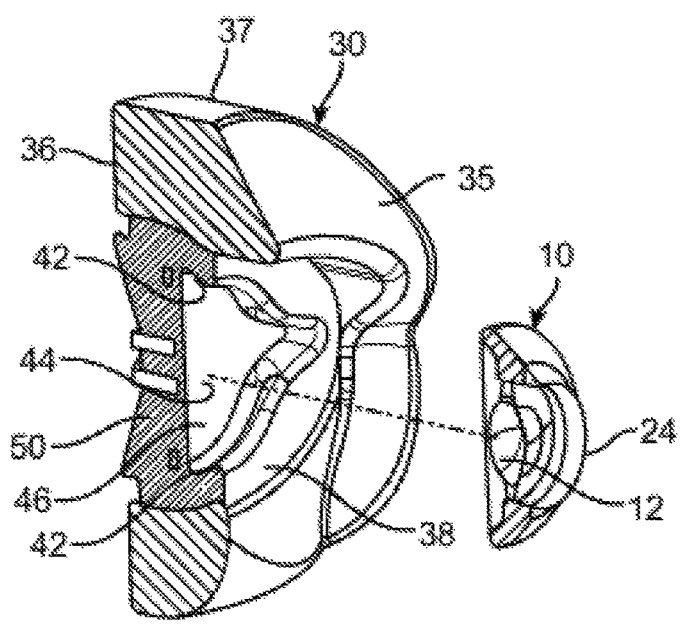
FIG. 8 is an exploded cross-section.

There is shown in FIGS. 5-14 a base 30 for the eye model 10. The base 30 can have a rigid outer support 34 and a suitable detachable engagement structure for securing the eye model 10. The outer support 34 can have an anterior face 35, a posterior face 36, and a sidewall 37. The detachable engagement structure can be flexible. A flexible engagement structure 38 can be provided with a protruding rim 42 and has a rear wall 44 defining a central opening 46. The dimensions of the opening 46 are less or equal than the dimensions of the outer support 20, such that the outer support 20 of the eye model 10 can be press fit through the opening 46 against the rear wall 44. Other detachable engagement structure is possible. As can be seen in FIG. 5, both the left and right sides can be modeled.

Figure 9:
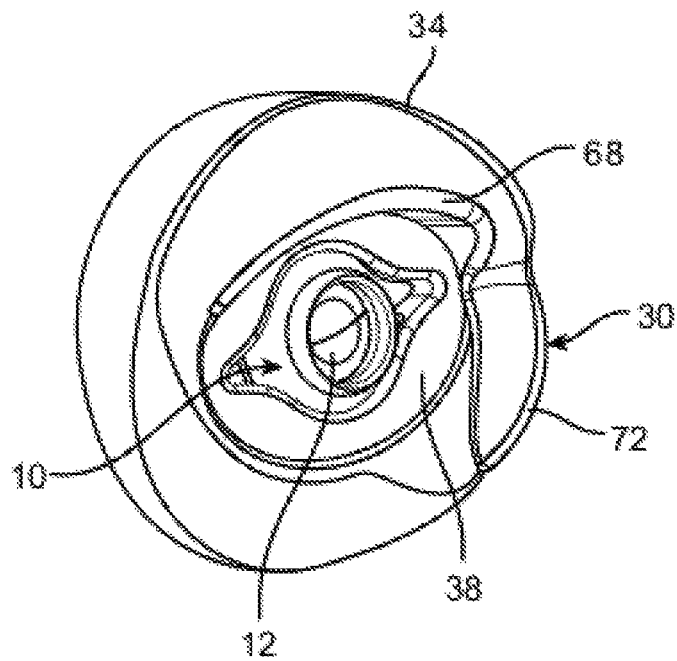
FIG. 9 is a perspective view of the assembled eye model and base.
Figure 10:
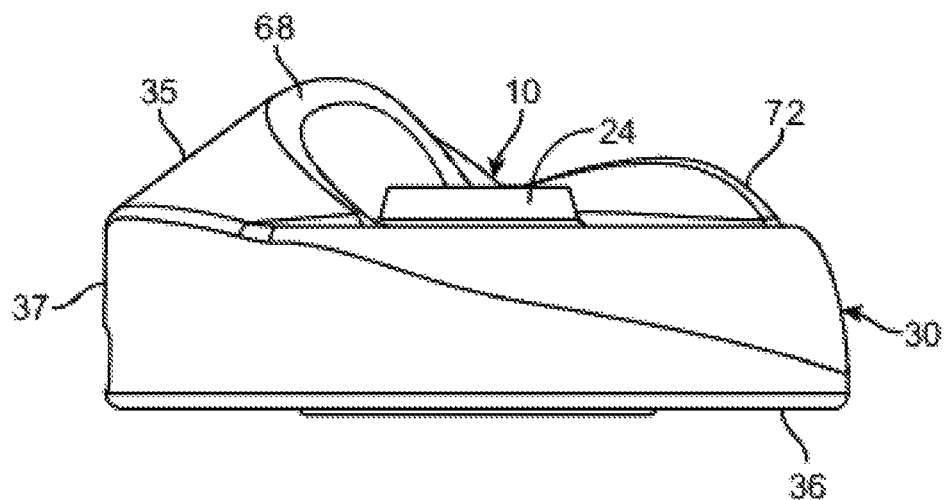
FIG. 10 is a side elevation.
Figure 11:
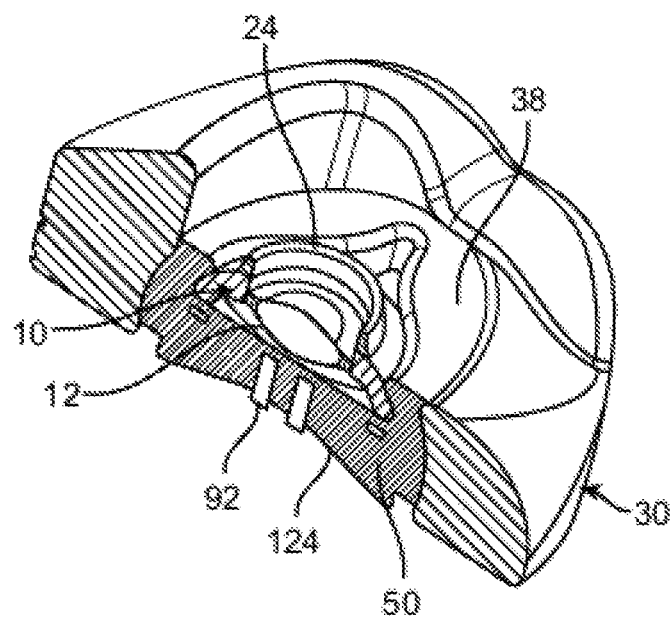
FIG. 11 is a perspective cross-section of the assembled eye model and base.
Figure 12:
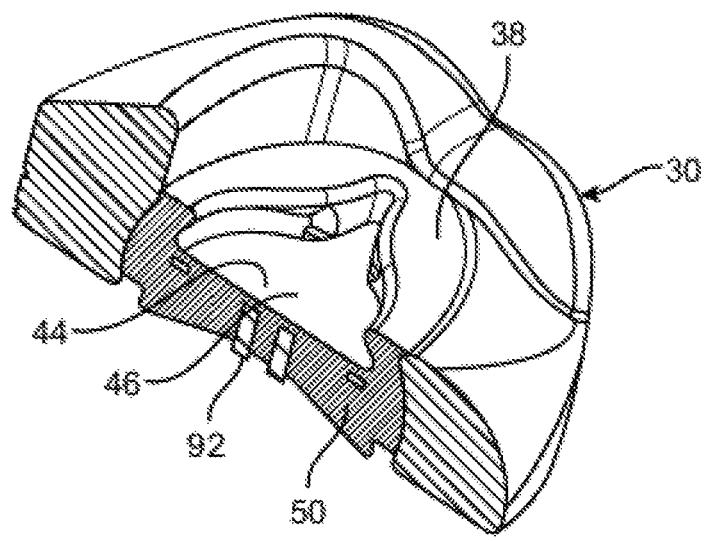
FIG. 12 is a perspective cross-section of the base.
Figure 13:
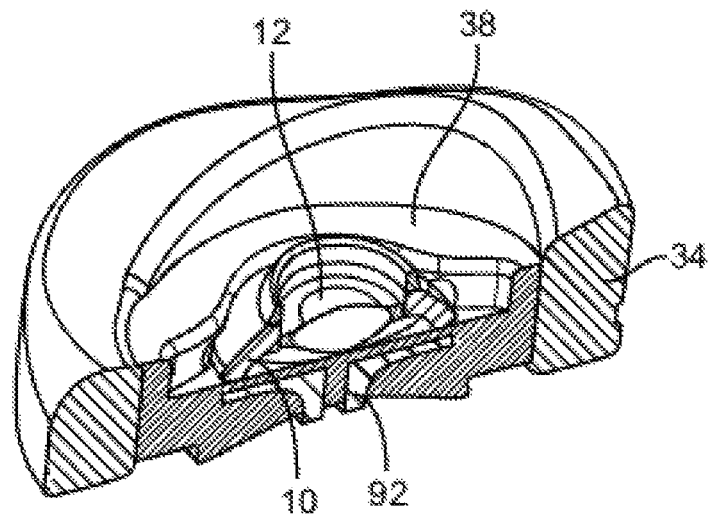
FIG. 13 is an axial iso-section of a base loaded with an eye model.
Figure 14:
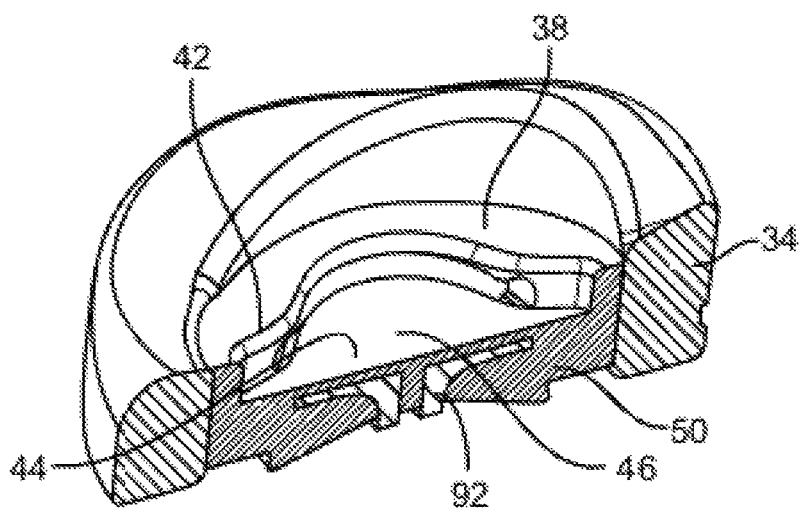
FIG. 14 is an axial iso-section of a base.
Figure 18:
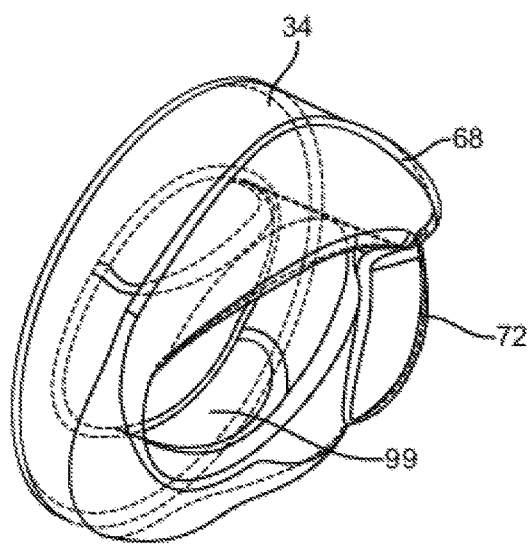
FIG. 18 is a perspective view partially in phantom.
Figure 19:
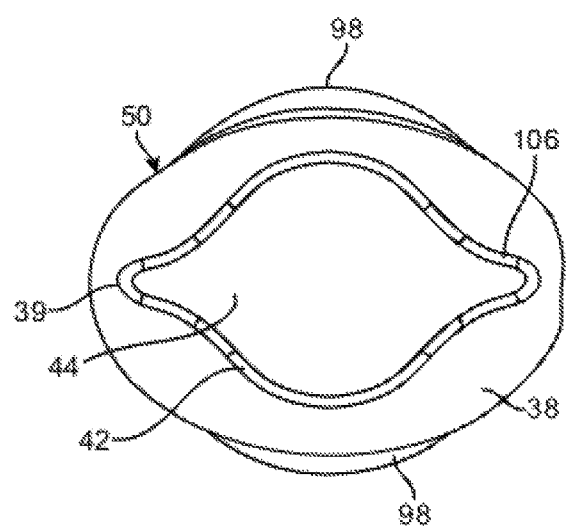
FIG. 19 is a plan view of the socket.
Figure 20:
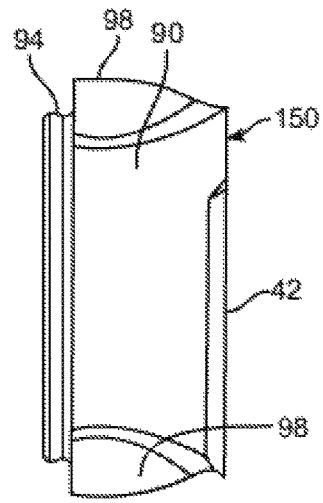
FIG. 20 is a side elevation.
Figure 21:
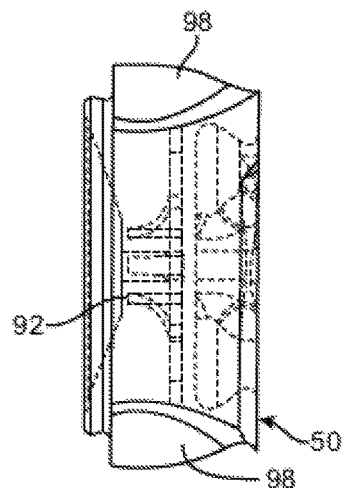
FIG. 21 is a side elevation, partially in phantom.
Figure 22:
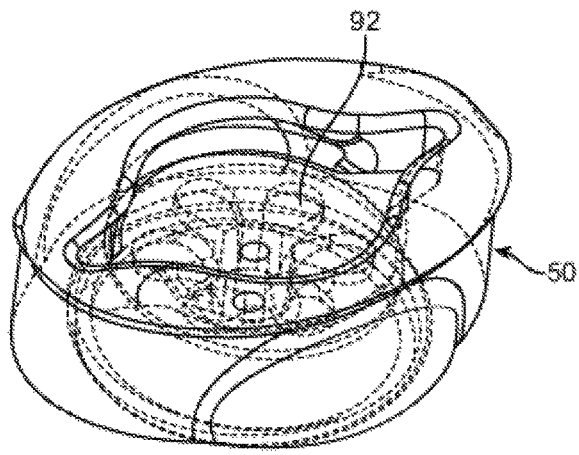
FIG. 22 is a perspective view, partially in phantom.
Figure 23:
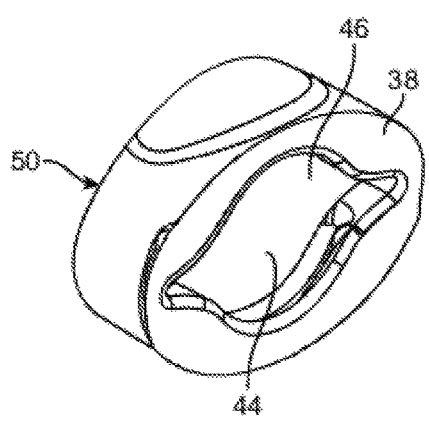
FIG. 23 is a perspective view.
Figure 24:
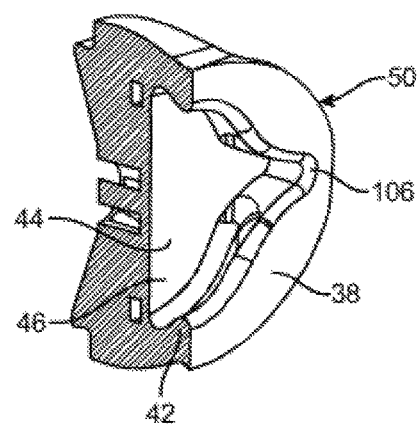
FIG. 24 is a cross-section.
Figure 25:
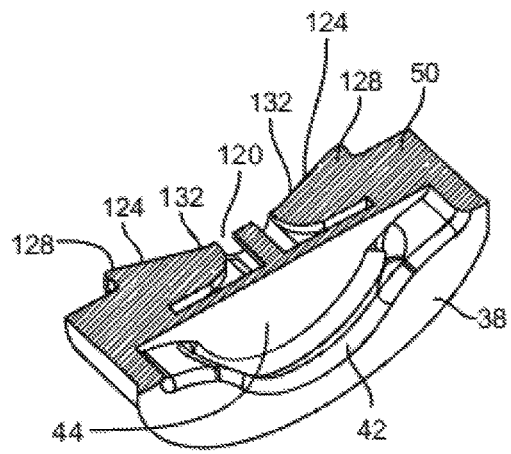
FIG. 25 is a cross-section in a direction that is transverse to the cross-section of FIG. 24.

As can be seen in FIGS. 9-10, the eye model 10 when pressed into the base 30 is securely held in position where the surgeon can conveniently practice surgical procedures on the eye model 10. These surgical procedures include, without limitation, cataract surgery in which a circular capsulorhexis is performed. The material making up the capsule 12 is selected to closely approximate the feel to the surgeon of a human capsule. Further the cortex material 16 has a hardness that approximates that of human cortex material. This can be the support material used in 3-D manufacturing processes. The cortex material 16 is removable by emulsification or other techniques used by eye surgeons to remove cortex material from the human eye during a surgical procedure.

The flexible engagement structure 38 comprising a protruding rim 42, rear wall 44 and opening 46 can be provided by a socket 50 as shown in FIGS. 18-25. The socket 50 can be secured to the outer support 34 by any suitable means, including mechanical and chemical attachment and bonding techniques. The socket 50 is comprised of a material with a hardness that is selected to mimic the compressible feeling of orbital fat. In this manner, the eye model 10 will have some give under pressure in the manner of a human eye.

The base 30 can be provided with other structure to enhance the surgical practice procedure. Bony structure simulating the brow 68 and nasal bones 72 can be provided in the rigid outer support 34. The rigid outer support 34 can have an interior wall a defining an opening 84 into which the socket 50 is formed during the 3D manufacturing process.

A posterior portion 94 of the socket 50 can assist in securing the base 30 to a working surface. Protrusions 98 can be provided on side 90 to assist in securing the flexible socket 50 to the outer support 34. The protrusions 98 can engage cooperating depressions 99 in the outer support 34.

Figures 26, 27, 28:
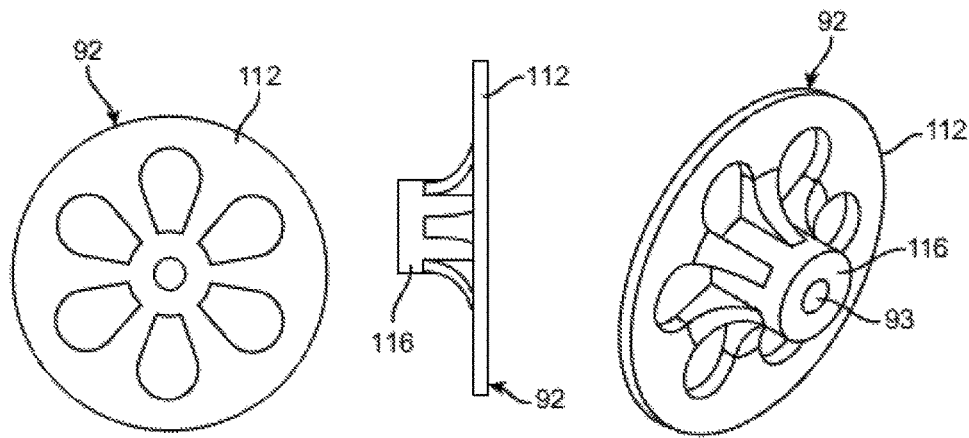
FIG. 26 is a plan view of a rigidifying member.
FIG. 27 is a side elevation.
FIG. 28 is a perspective view.
Figure 29:
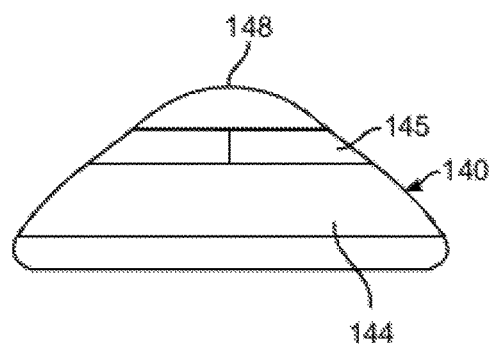
FIG. 29 is a side elevation of an eye model with a corneal button.
Figure 30:
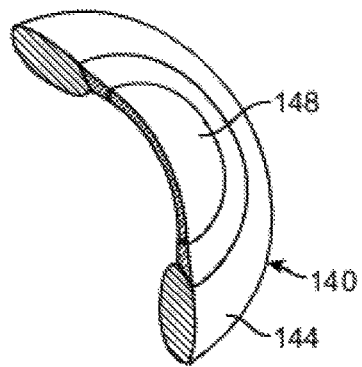
FIG. 30 is a perspective view, in cross-section.
Figure 31:
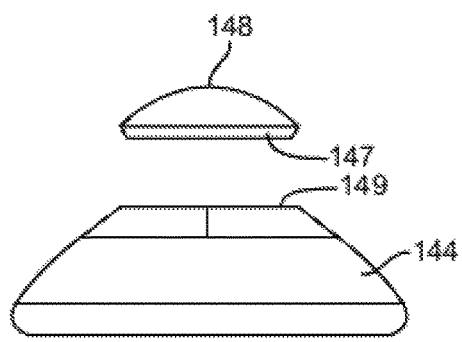
FIG. 31 is an exploded side elevation.
Figure 32:
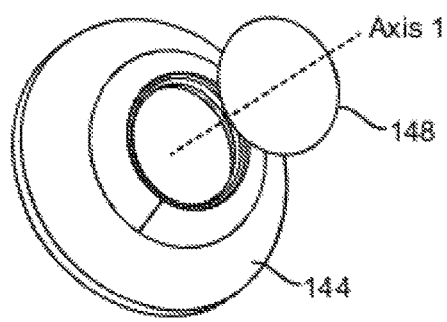
FIG. 32 is an exploded perspective view.

A rigidifying member 92 can be provided within the socket 50 to give a desired amount of rigidity to the socket 50 and to assist in the removal of the eye model 10 from the detachable engagement structure. The rigidifying member 92 is shown in FIGS. 26-28. The rigidifying member 92 can include a disc portion 112 and a central push column 116 that is in communication with the disc portion 112. Manual pressure on the push column 116 will act on the disc portion 112 and the rear wall 44 of the socket 50 to eject the eye model 10. The socket 50 can have a cavity 120 into which the rigidifying member 92 is positioned. The rigidifying member 92 acts as a release pin or piston. The socket 50 may include this rigidifying member to stabilize the base/floor of the eyelid socket, to provide additional means of removing a used eye model 10 by pressing it from behind to eject the eye model 10, and to act as a travel limit to the compression. Other structure for ejecting the eye model 10 is possible.

The back of the socket 50 can have a cone surface 124. This cone surface 124 provides room for the flexible structures to move and can act as a suction cup when pressed against a flat surface. This will help fix the base 30 in place. The inclined cone surface 124 has lateral vertically spaced edges 128 and 132 which create a cavity under the socket 50 to provide for some give when the eye model 10 in the socket 50 is pressed. This will help to model the presence of orbit fat in humans, which yields somewhat when pressure is applied on the eye during surgical procedures.

The purpose of the base 30 and bony structures such as brow 68 and nasal bones 72 is to act as a rigid base for the model, provide anatomical references in the form of the brow and the nose, and provide realistic facial topological constraints for the surgical procedure, in the form of the brow and the nose. The surgeon must manipulate the instruments around these features. This structure also provides the space to nest the socket 50 including the flexible engagement structure 38, which in some aspects resembles the eyelid anatomy. The socket 50 simulates the feel of the cushioned support provided to the eye by orbital fat. The real eye is not rigidly fixed in the socket, but nested on a fatty cup that has compressive and elastic properties.

The purpose of the flexible engagement structure 38 is to receive, secure and position the eye model 10 with relation to the bone structure. It also simulates the superior and inferior eyelids. These can be opened by eyelid speculums. These are retractors used in surgery. The flexible engagement structure can be formed to model the caruncula 39 (corner of the eye).

The socket structure 50 can be made of a translucent material that allows light to pass through, allowing the use of retro-illumination. The rigidifying member or piston 92 may have a central hole 93 to allow light to pass through in case retro-illumination is desired. Too much "give" may make the eye model 10 difficult to insert into the socket 50. The rigidifying member or piston 92 will allow a certain maximum deflection, depending on the length of the stem 116, before it contacts the working surface underneath making the eyelid floor rigid. The piston 92 may also allow to transfer motion to the eye model 10. The back stem 116 may have a length allowing it to be coupled and moved like a joy-stick. The motion would be transferred to the back the disc 112, distort the back wall 44 in a way that would make the eye model 10 move.

The invention represents the critical anatomical features with a reduced footprint, with respect to whole face models. This makes it easier to make, pack, ship and use under a microscope. It is also optimized for manufacturing with 3D printing since cost and manufacturing time is related to size rather than complexity. The model can be made as a left and right version so surgeon practices both approaches. No assembly is required to create the orbit structure 30. No tools are required to insert and secure eye model 10. The base 30 is re-usable, and the eye model 10 is single-use and disposable without requiring biohazard material handling procedures.

There is shown in FIGS. 29-32 an eye model 140 for practicing corneal transplant or other refractive surgical procedures. The eye model 140 includes an outer support 144, limbus 145 and corneal button 148 made with material properties similar to the human eye. The corneal button 148 has a posterior edge 147 and the limbus 145 has an anterior edge 149. The posterior edge 147 of the cornea 148 mates with the anterior edge 149 of the limbus 145. The surgeon can thereby practice procedures such as corneal button suturing on this eye model 140. The eye model 140 can also be used in conjunction with the base 30 and can be interchangeable with the eye model 10.

Figure 33:
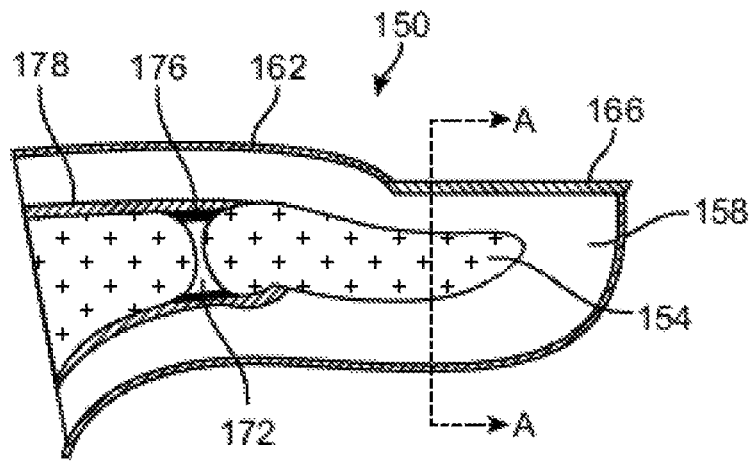
FIG. 33 is a schematic cross-section of a finger model.
Figure 34:
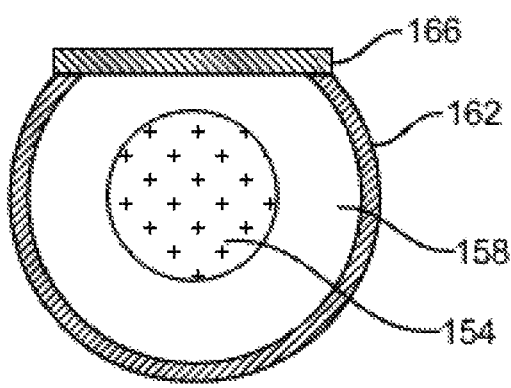
FIG. 34 is a cross-section taken along A-A in FIG. 33.

A finger model 150 is shown in FIGS. 33-34. The finger model 150 includes bone 154, muscle 158, skin 162, nail 166, synovial space 172, ligament 176, and tendon 178. Each of these structures is made of a material with a hardness selected to replicate the feel to the surgeon of human tissue. These include skin (dense connective tissue) Shore A 40-75, nail (supportive connective tissue) Shore D 20 and above, muscle Shore A 10-40, bone (supportive connective tissue) Shore D 85, ligament (dense connective tissue) Shore A 30-60, tendon (dense connective tissue) Shore A 60-95 and synovial space filled with support material.

Figure 35:
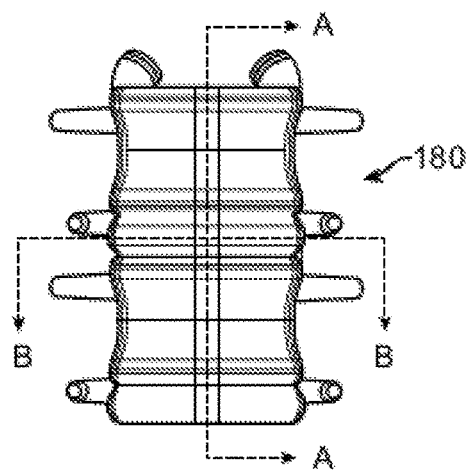
FIG. 35 is a front elevation of a spinal model.
Figure 36:
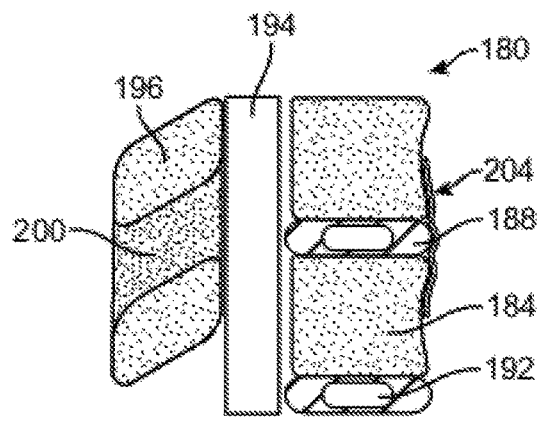
FIG. 36 is a cross-section taken along A-A in FIG. 35.
Figure 37:
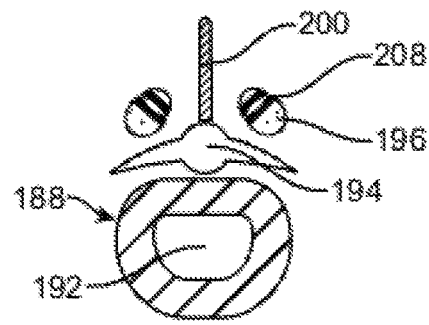
FIG. 37 is a cross-section taken along B-B in FIG. 35.
Figure 38:
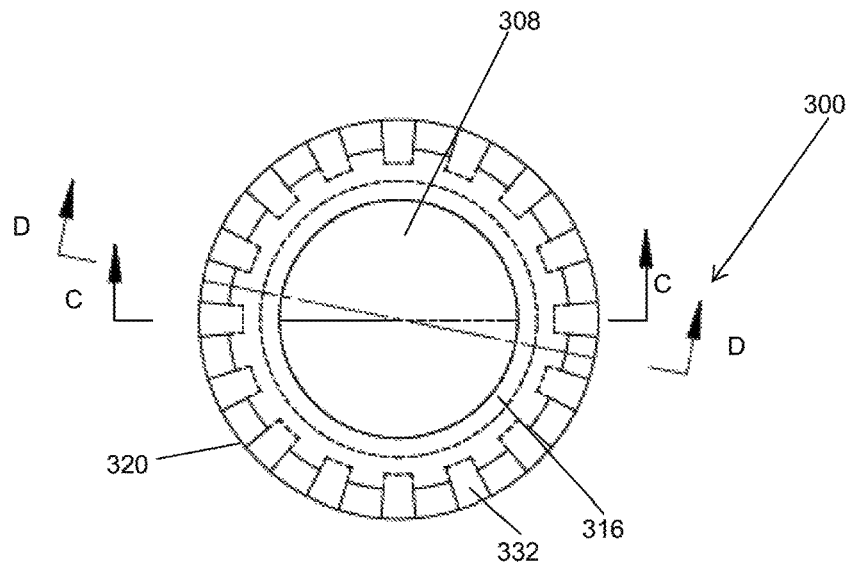
FIG. 38 is a plan view of a synthetic lens model according to the invention.
Figure 39:
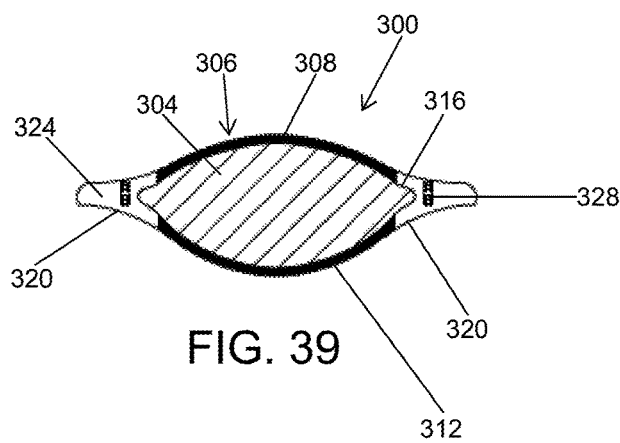
FIG. 39 is a cross-section taken along line C-C in FIG. 38.
Figure 40:
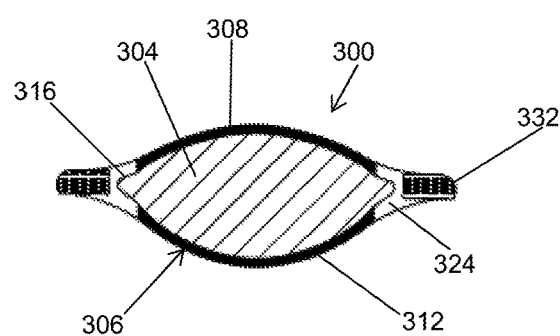
FIG. 40 is a cross-section taken along line D-D in FIG. 38.
Figure 41:
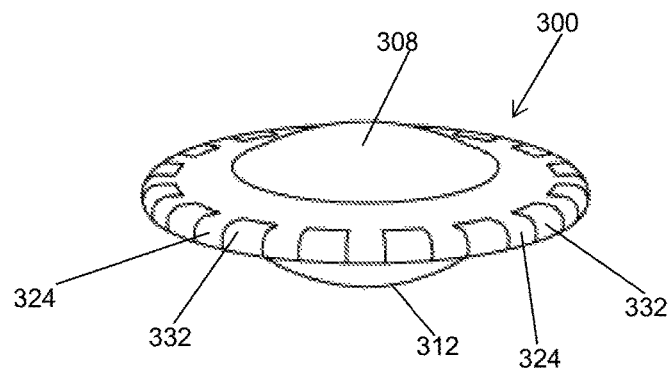
FIG. 41 is a perspective view.
Figure 42:
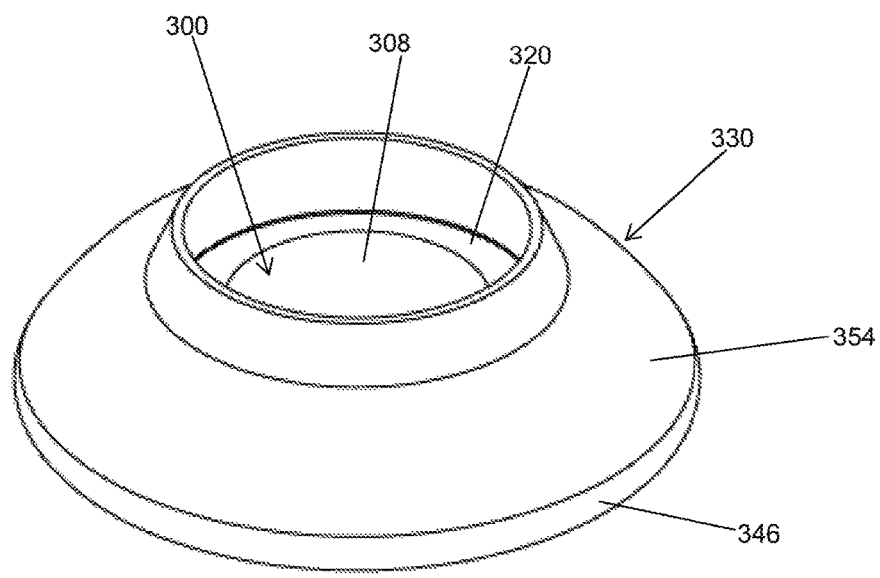
FIG. 42 is a perspective view of a synthetic lens model positioned in a base.
Figure 43:
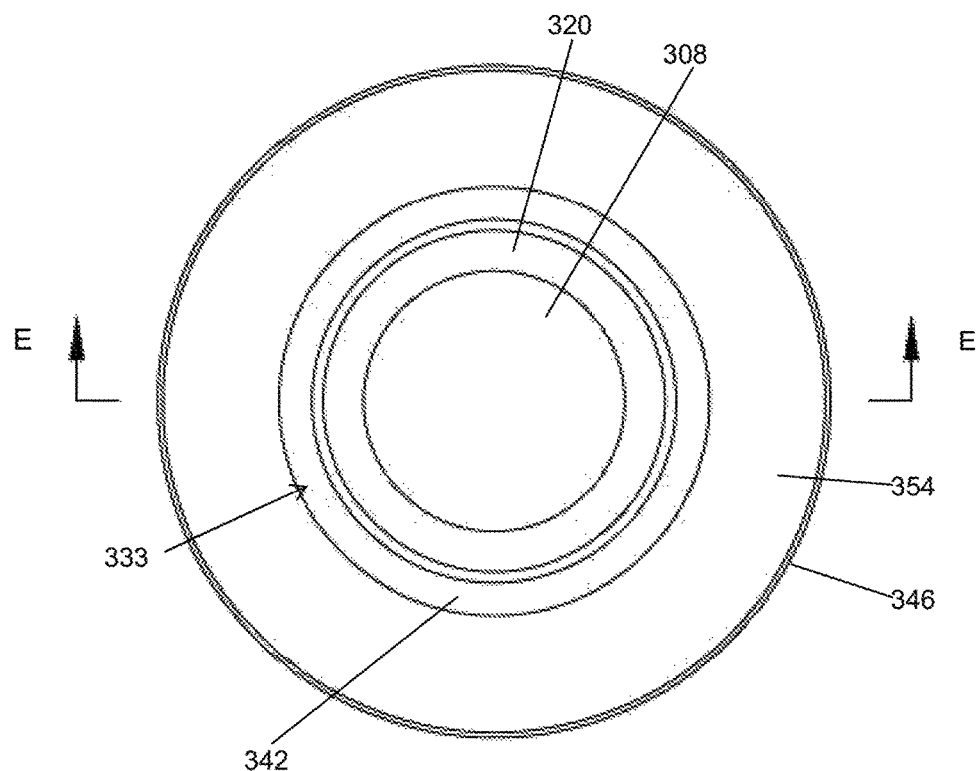
FIG. 43 is a plan view.
Figure 44:
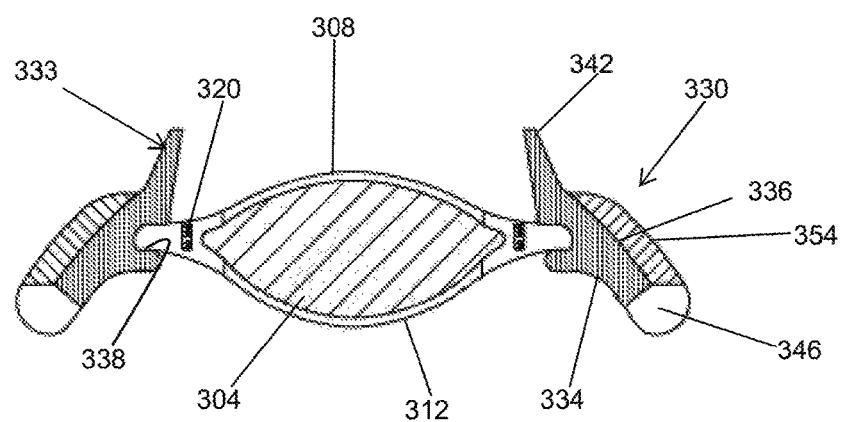
FIG. 44 is a cross-section taken along line E-E in FIG. 43.

A vertebral model is shown in FIGS. 35-37. The vertebral model 180 includes vertebral body 184, anulus fibrosus 188, nucleus pulposus 192, spinal cord 194, spinous process bone 196, interspinous ligament 200 and anterior longitudinal ligament 204. Each of these structures is made of a material with a hardness selected to replicate the field to the surgeon of human tissue. These include bone (supportive connective tissue) Shore D 60 and above, anulus fibrosus (dense connective tissue) Shore A 40-70, nucleus pulposus (cellular tissue) support material, spinal cord (cellular tissue) support material, anterior longitudinal ligament (dense connective tissue) Shore A 40-70, interspinous ligament (dense connective tissue) Shore A 40-70 and facets (supportive connective tissue) Shore D 20-60.

A synthetic eye model for practicing surgery is shown in FIGS. 38-46. The synthetic eye model 300 can include an artificial lens cortex material 304, a capsule 306 surrounding the lens cortex material 304 and defining an anterior side 308 and a posterior side 312, and a circumferential lateral side 316. An annular engagement rim 320 extends radially outwardly from the circumferential lateral side 316. The engagement rim 320 can comprise a stiffening material having a hardness greater than that of the lens cortex material and the capsule. The engagement rim 320 further can include a flexible material 324 with a hardness less than that of the stiffening material.

The engagement rim 320 can include a circumferentially distributed rigid support comprising the stiffening material. The rigid support can include a support ring 328. The rigid support can include a plurality of spaced apart support projections 332 extending radially outwardly from the support ring 328.

A base 330 can be provided and includes an annular wall 333 having interior face 334 and exterior face 336. The interior face 334 can include a circumferential groove 338 dimensioned to receive a portion of the engagement rim 320 to secure the synthetic eye model 300 to the base 330. Other suitable engagement structure can be utilized.

The artificial lens cortex material 304, the capsule 306, and the annular engagement rim 320, can be monolithic and comprised entirely of 3D printed materials. All components of the base 330 can be monolithic and comprised entirely of 3D printed materials. The capsule 306 can have a hardness that is below 95 A Shore. The cortex material 304 can have a tensile strength or a flexural strength lower than 20 MPa and lower than the tensile strength or flexural strength of the capsule and the annular engagement rim. The cortex material 304 can comprise at least 20% 3D printing support material. The stiffening material can have a hardness above 20D Shore. The flexible material can have a hardness less than 95 A Shore. The annular wall 333 of the base 330 can comprise material less than 95 A Shore. A posterior portion 346 of the annular wall 333 can comprise material greater than 20D Shore. A softer material can comprise a circumferential portion 354 which can be provided to mimic the sclera.

The base 330 can include an anteriorly extending circumferential flange 342. The anteriorly extending flange 342 can have a hardness less than 95 A Shore. The flange 342 allows the practice of certain procedures requiring instruments to be inserted into the eye. An incision can be made in the flange 342 to practice these procedures.

Figure 45:
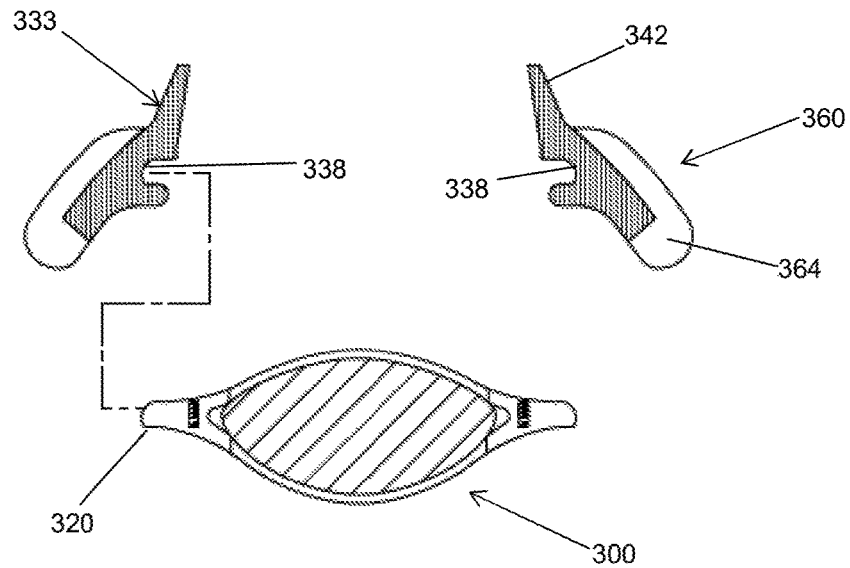
FIG. 45 is an exploded view, partially in cross-section.
Figure 46:
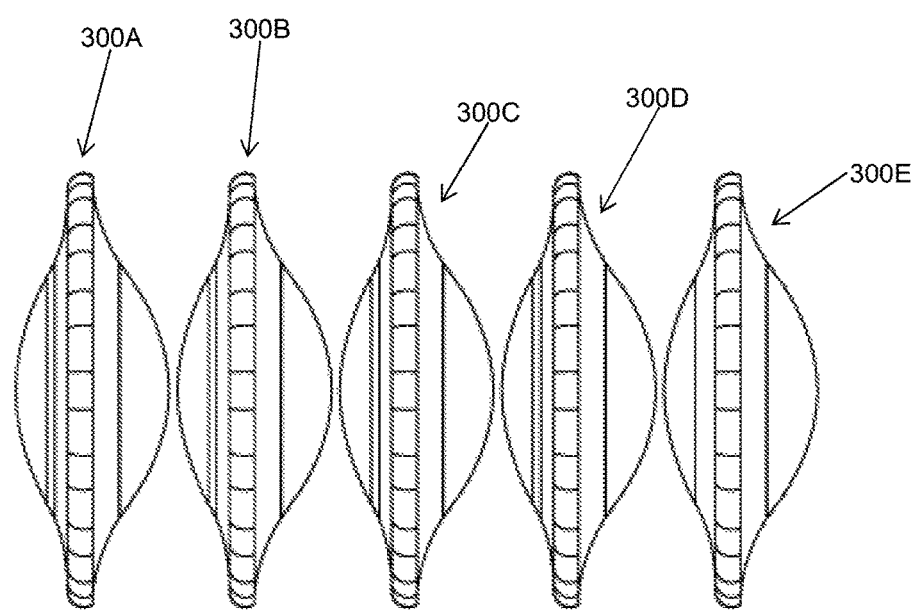
FIG. 46 is a side elevation of multiple synthetic lens models.

As shown in FIG. 45, the synthetic lens 300 can be readily attached and detached from the base 330. A procedure can be practiced on a lens 300, and then the lens 300 can be replaced with another lens and the procedure can be repeated, or a different procedure can be practiced. As shown in FIG. 46, several synthetic lens models 300 A-E can be provided and interchangeably used with the same base 330. The lens models 300 A-E can be substantially the same such that a procedure can be repeated, or the lens models can each be different such that the same procedure can be practiced on an anatomically different lens model, or entirely different procedures can be practiced in sequence using the same base 330.

Figure 47:
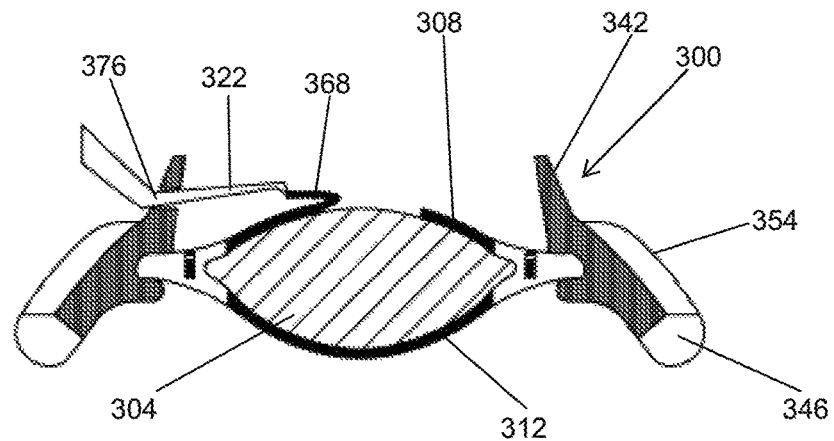
FIG. 47 is a cross section illustrating a 1$^{st}$ capsulorhexis simulation method step according to the invention.
Figure 48:
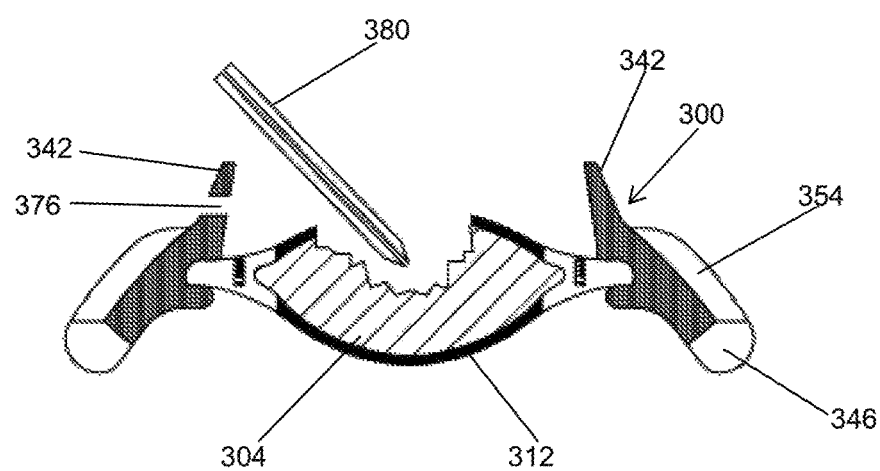
FIG. 48 is a cross-section illustrating a phacoemulsification simulation method step.

There is shown in FIG. 47 a method of practicing surgery such as capsulorhexis in which an incision 376 is made in the flange 342. The incision 376 can be made as part of the practice procedure, or an aperture can be preformed in the flange 342. An instrument 322 can be used to form a tear in the anterior surface 308 of the capsule 306, and a flap 368 can be created to permit access to the cortex material 304. As shown in FIG. 48, an instrument 38 can be used to practice removal of the cortex material 304. An intraocular implant (not shown) can be inserted into the empty capsule after cortex material has been removed from the capsule.

Figure 49:
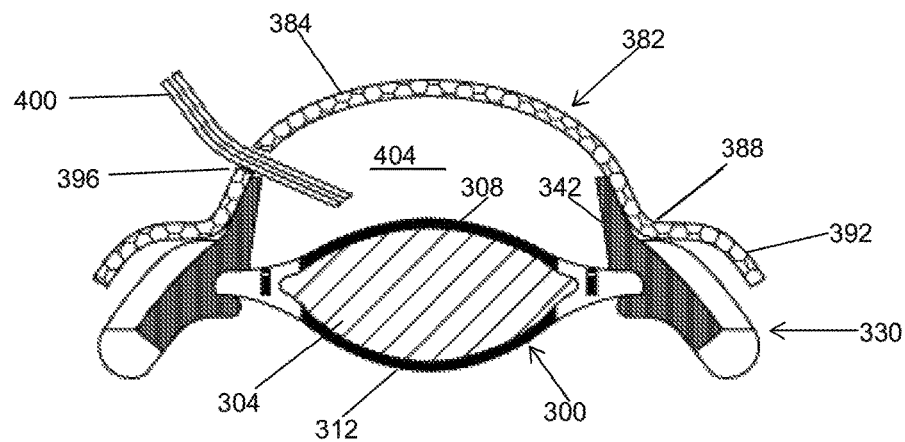
FIG. 49 is a cross-section illustrating an embodiment with a corneal button.

The synthetic eye model 300 can further include a synthetic corneal button 382, as shown in FIG. 49. The corneal button 382 can have an anterior portion 384 and a posterior portion 388. An extension or flap 392 can be provided to facilitate removal of the corneal button 382 if desired. The circumferential flange 342 can have an outer surface, and the posterior portion 388 of the corneal button 382 can mate with the outer surface of the circumferential flange 342. The corneal button 382 can be secured to the circumferential flange 342 by any suitable method, such as a fluid tight adhesive, whereupon the anterior chamber 404 can be filled with fluid by a syringe or other suitable technique. An incision 396 can be made at a suitable location in the corneal button 382. An instrument 400 can be inserted into the anterior space 404 to practice surgery.

Figure 50:
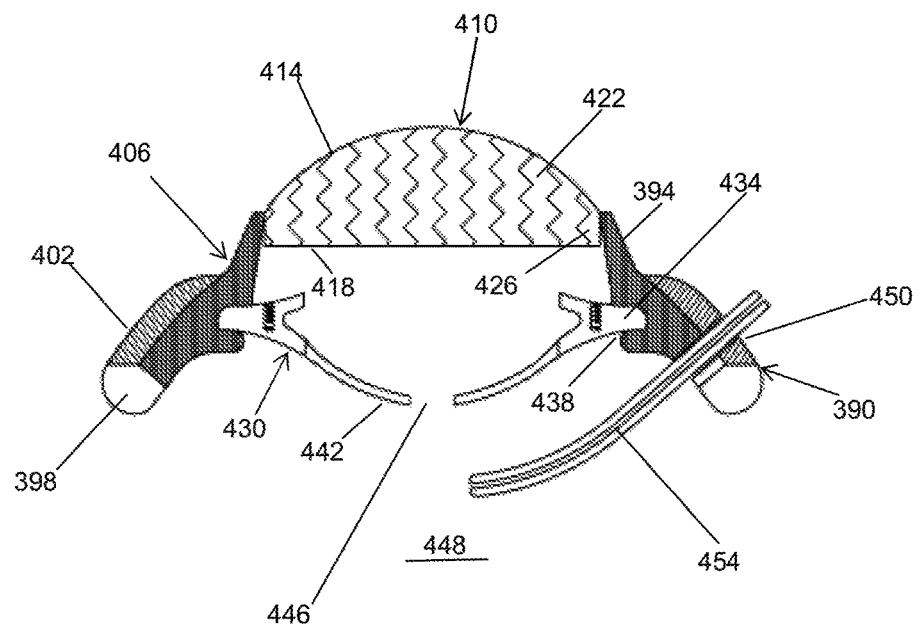
FIG. 50 is a cross-section illustrating an embodiment with an optical lens and a capsular aperture for practicing procedures posterior to the lens.

An alternative embodiment is shown in FIG. 50 which is useful for practicing procedures posterior to the lens capsule. A base 390 can have an annular wall 406 and anteriorly extending circumferential flange 394. The base 390 can also include posterior rigid circumferential material 398 and sclera simulating material 402 if desired, but such is not necessary. An optical lens 410 can be provided to re-create the magnification of the human eye which must be compensated for during surgical procedures posterior to the capsule.

The lens 410 can have a convex anterior surface 414 and flat posterior surface 418 to provide appropriate optical magnification. The body 422 of the lens 410 can be made of a material which is optically transparent. The lens 410 can be produced by any suitable method such as molding, turning, grinding, 3D printing, or the like. The lens can be engaged to the base 390 by any suitable means. In one embodiment, the lens 410 has a squared off circumferential edge 426 that is elastically engaged by the circumferential flange 394. Other engagements are possible.

A capsule 430 can be provided and can have a circumferential rim 434 as previously described which can mate with suitable structure such as groove 438 in the base 390. The capsule 430 can have an opening 446 in a posterior side 442 which permits sighting through the capsule 430. An incision 450 can be made in the base 390 as shown in FIG. 50 to permit the insertion of a surgical instrument 454. The surgeon can sight through the optical lens 410 and opening 446 in the capsule 430 to manipulate the instrument 454 in the posterior space 448 in a manner that closely resembles an actual procedure.

The optical lens 410 can have an optical power of from 0 diopters to 100 diopters. The optical lens 410 can be detachable or permanently affixed as by an adhesive to the base 390. The optical lens 410 can be provided by any suitable optically transparent material.

The disclosure of all references cited herein is hereby incorporated fully by reference. All ranges noted herein are intended to be inclusive of any low and high value within the range, such that, for example 50-100 is inclusive of 60-80 and 75-95, and any other range with a low value and a high value within the range. This invention can be embodied in other forms without departing from the spirit or essential attributes thereof. Accordingly, reference should be had to the following claims to determine the scope of the invention.

I claim:

1. A synthetic eye model for practicing surgery, comprising:
   an artificial lens cortex material;
   a capsule surrounding the lens cortex material and defining anterior and posterior sides, and a circumferential lateral side;
   an annular engagement rim extending radially outwardly from the circumferential lateral side, the engagement rim comprising a stiffening material having a hardness greater than that of the lens cortex material and the capsule; and, a base, the base comprising an annular wall having interior and exterior faces, and the interior face comprising a circumferential groove dimensioned to receive the engagement rim.

2. The synthetic eye model of claim 1, wherein the engagement rim further comprises a flexible material with a hardness less than that of the stiffening material.

3. The synthetic eye model of claim 2, wherein the flexible material has a hardness less than 95A Shore.

4. The synthetic model of claim 2, wherein the engagement rim comprises a circumferentially distributed rigid support comprising the stiffening material.

5. The synthetic model of claim 4, wherein the rigid support comprises a support ring.

6. The synthetic model of claim 5, wherein the rigid support comprises a plurality of support projections extending radially outwardly from the support ring.

7. The synthetic eye model of claim 1, wherein the stiffening material has a hardness above 20D Shore.

8. The synthetic model of claim 1, wherein the artificial lens cortex material, the capsule, and the annular engagement rim are monolithic and comprised entirely of 3D printed materials.

9. The synthetic eye model of claim 1, wherein the base further comprises an anteriorly extending circumferential flange.

10. The synthetic eye model of claim 9, wherein the anteriorly extending flange has a hardness less than 95A Shore.

11. The synthetic eye model of claim 9, further comprising a synthetic corneal button, the corneal button having a posterior surface and the circumferential flange having an outer surface, the posterior surface of the corneal button mating with the outer surface of the circumferential flange.

12. The synthetic eye model of claim 9, wherein the circumferential flange comprises an aperture.

13. The synthetic eye model of claim 9, further comprising an optical lens having an outer surface and the circumferential flange having an interior surface, the outer surface of the optical lens elastically mating with the interior surface of the circumferential flange.

14. The synthetic eye model of claim 1, wherein the capsule has a hardness that is below 95A Shore.

15. The synthetic eye model of claim 1, wherein the cortex material has a tensile strength or a flexural strength lower than 20 MPa and lower than the tensile strength or flexural strength of the capsule and the annular engagement rim.

16. The synthetic eye model of claim 1, wherein the cortex material is at least 20% 3D printing support material.

17. The synthetic eye model of claim 1, wherein the base comprises an aperture.

18. The synthetic eye model of claim 1, wherein the capsule comprises an aperture.

19. The synthetic eye model of claim 1, further comprising an optical lens.

20. The synthetic eye model of claim 19, wherein the optical lens has an optical power of from 0 diopters to 100 diopters.

21. The synthetic eye model of claim 19, wherein the optical lens is detachable.

22. The method of claim 21 wherein the base further comprises an anteriorly extending circumferential flange, and the method comprises creating an incision in the circumferential flange.

23. The method of claim 22, further comprising the step of inserting an instrument through the incision, creating a tear in the capsule.

24. The method of claim 23, further comprising the step of removing cortex material from the capsule through the tear.

25. The method of claim 23, further comprising the step of inserting an intraocular implant into the capsule after cortex material has been removed from the capsule.

26. The synthetic eye model of claim 1, wherein the annular wall comprises material less than 95A Shore.

27. The synthetic eye model of claim 26, wherein a posterior portion of the annular wall comprises material greater than 20D Shore.

28. A method of practicing surgery, comprising the steps of:
   providing a synthetic eye model for practicing surgery, comprising an artificial lens cortex material, a capsule surrounding the lens cortex material and defining anterior and posterior sides, and a circumferential lateral side, an annular engagement rim extending radially outwardly from the circumferential lateral side, the engagement rim comprising a stiffening material having a hardness greater than that of the lens cortex material and the capsule; and a base comprising an annular wall having interior and exterior faces, and the interior face comprising a circumferential groove dimensioned to receive the engagement rim; and, practicing surgery on the synthetic eye model.

29. The method of claim 28, further comprising the step of providing an aperture in the posterior side of the capsule.

30. The method of claim 29, further comprising the step of attaching an optical lens to the circumferential flange.

31. The method of claim 28, further comprising the step of providing an aperture in the annular wall of the base, and inserting an instrument through the incision to practice surgery posterior to the capsule.

32. The method of claim 28, further comprising the step of removing the capsule and annular engagement rim after practicing surgery, and replacing with another artificial lens cortex material, capsule, and annular engagement rim.

* * * * *